US011551216B2

(12) United States Patent
Murao

(10) Patent No.: US 11,551,216 B2
(45) Date of Patent: Jan. 10, 2023

(54) TRANSACTION SECURITY ON DISTRIBUTED-LEDGER BASED MAAS PLATFORM

(71) Applicant: SONY CORPORATION, Tokyo (JP)

(72) Inventor: Sadayoshi Murao, Bangalore (IN)

(73) Assignee: SONY CORPORATION, Tokyo (JP)

( * ) Notice: Subject to any disclaimer, the term of this patent is extended or adjusted under 35 U.S.C. 154(b) by 475 days.

(21) Appl. No.: 16/839,213

(22) Filed: Apr. 3, 2020

(65) Prior Publication Data
US 2020/0349569 A1 Nov. 5, 2020

Related U.S. Application Data

(60) Provisional application No. 62/841,528, filed on May 1, 2019.

(51) Int. Cl.
*G06F 15/16* (2006.01)
*G06Q 20/40* (2012.01)
(Continued)

(52) U.S. Cl.
CPC .......... *G06Q 20/401* (2013.01); *G06Q 10/02* (2013.01); *G06Q 20/3825* (2013.01);
(Continued)

(58) Field of Classification Search
CPC ............................... G06Q 50/30; H04W 4/46
See application file for complete search history.

(56) References Cited

U.S. PATENT DOCUMENTS 8,621,598 B2  12/2013 Lai et al.
10,204,148 B2  2/2019 Madisetti et al.
(Continued)

FOREIGN PATENT DOCUMENTS

CA  3068427 A1  1/2019
CN  109510760 A  3/2019
(Continued)

OTHER PUBLICATIONS

International Search Report & Written Opinion of PCT Application No. PCT/IB2020/054008, dated Jun. 2, 2020, 13 pages.
(Continued)

*Primary Examiner* — Patrick McAtee
*Assistant Examiner* — Nakia Leffall-Allen
(74) *Attorney, Agent, or Firm* — Chip Law Group

(57) ABSTRACT

A system and method for implementation of transaction security on a distributed ledger-based Mobility-as-a-Service (MaaS) platform is provided. The system includes a message broker device which receives a transaction request associated with a transport service from a publisher node of a transportation provider. The message broker device routes, via an API gateway hosted on the message broker device, the transaction request to a subscriber node of the transportation provider. The API gateway validates the transaction request based on application of a set of security rules on the transaction request. The subscriber node is associated with a first node of a distributed ledger node that stores a first state object. The first state object includes transaction data associated with the transport service. The distributed ledger node receives the validated first transaction request from the API gateway, via the subscriber node and updates the transaction data based on the received transaction request.

23 Claims, 9 Drawing Sheets

(51) Int. Cl.
G06Q 50/30 (2012.01)
G06Q 10/02 (2012.01)
G06Q 20/38 (2012.01)

(52) U.S. Cl.
CPC ......... G06Q 20/405 (2013.01); G06Q 20/407 (2013.01); G06Q 50/30 (2013.01); G06Q 2240/00 (2013.01)

(56) References Cited

U.S. PATENT DOCUMENTS

| | | | | |
|---|---|---|---|---|
| 2005/0228984 | A1* | 10/2005 | Edery | H04L 63/0227 |
| | | | | 713/153 |
| 2014/0222594 | A1* | 8/2014 | Rose | G06Q 20/385 |
| | | | | 705/16 |
| 2017/0352012 | A1* | 12/2017 | Hearn | G06Q 20/3829 |
| 2018/0115523 | A1 | 4/2018 | Subbarayan et al. | |
| 2018/0317067 | A1* | 11/2018 | Ameixieira | H04W 76/10 |
| 2018/0338001 | A1* | 11/2018 | Pereira Cabral | H04L 67/141 |
| 2018/0350024 | A1* | 12/2018 | Kaufman | G06Q 50/30 |
| 2018/0375840 | A1* | 12/2018 | Moy | H04L 67/01 |
| 2019/0044976 | A1 | 2/2019 | Smith | |
| 2020/0351192 | A1* | 11/2020 | Murao | H04L 45/74 |

FOREIGN PATENT DOCUMENTS

| | | |
|---|---|---|
| EP | 3451608 A1 | 3/2019 |
| EP | 3549080 A1 | 10/2019 |
| EP | 3646213 A1 | 5/2020 |
| WO | 2018/100371 A1 | 6/2018 |
| WO | 2018/190983 A1 | 10/2018 |
| WO | 2019/005985 A1 | 1/2019 |
| WO | 2019/042754 A1 | 3/2019 |

OTHER PUBLICATIONS

Philippe Crist, "Blockchain and Beyond: Encoding 21st Century Transport Corporate Partnership Board Report Corporate Partnership Board CPB", Corporate Partnership Board Report, May 17, 2018, 63 pages.

* cited by examiner

TRANSACTION SECURITY ON DISTRIBUTED-LEDGER BASED MAAS PLATFORM

CROSS-REFERENCE TO RELATED APPLICATIONS/INCORPORATION BY REFERENCE

This application claims priority to U.S. Provisional Patent Application Ser. No. 62/841,528 filed on May 1, 2019, the entire content of which is hereby incorporated herein by reference.

FIELD

Various embodiments of the disclosure relate to Mobility-as-a-Service (MaaS) and distributed ledger technology. More specifically, various embodiments of the disclosure relate to a system and a method for implementation of transaction security on a distributed ledger-based MaaS platform.

BACKGROUND

Many transportation providers provide their services through infrastructures based on a closed platform. For example, a transportation provider may have a separate ticketing infrastructure (such as ticketing gates and Point-of-Sale (PoS) devices) or a separate application (such as a ticket booking application or a ride hailing application) for create, pay for, or manage a trip.

With growing number of transportation providers, there has been a demand for a MaaS platform which may provide a unified gateway to create, pay for, and manage a trip that may rely on services of multiple transportation providers. A typical MaaS platform may include participation of multiple transportation providers, such as airline companies, ride hailing companies, car rental companies, carpooling companies, rail network companies, or a combination thereof. Typically, each transportation provider on the MaaS platform has a closed infrastructure with minimum to no connectivity with infrastructures of other transportation providers. With limited connectivity, individual transport providers may have trust and privacy concerns associated with common billing, route planning, revenue sharing, and the like.

Limitations and disadvantages of conventional and traditional approaches will become apparent to one of skill in the art, through comparison of described systems with some aspects of the present disclosure, as set forth in the remainder of the present application and with reference to the drawings.

SUMMARY

A system and a method for implementation of transaction security on a distributed ledger-based MaaS platform, are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed system and method for implementation of transaction security on a Mobility-as-a-Service (MaaS) platform. The disclosed system may be a federated transportation management system that may facilitate multiple homogeneous or heterogenous transport providers and their infrastructure, such as ticketing gates, applications, and/or PoS devices to operate on a common MaaS platform to provide various transport services. Each transportation provider may enjoy secure data ownership and may control co-use of relevant transaction data through the distributed ledger. This may enhance connectivity between the various transportation providers.

With sharing of IT infrastructure amongst the transportation providers, each individual transport provider may save costs associated with ownership of Information Technology (IT) infrastructure and capex on operations and infrastructure expansion. Also, the distributed ledger may facilitate sharing of revenue amongst the transportation providers for a MaaS transport service based on transaction data records on the distributed ledger associated with the concerned transportation providers, who may be a party to transactions associated with a MaaS transport service.

Exemplary aspects of the disclosure provide a system that includes a message broker device that may be configured to route, via an Application Programming Interface (API) gateway hosted on the message broker device, a transaction request received from a publisher node of a transportation provider to a subscriber node of the transportation provider.

The transportation provider may be one of multiple transportation providers associated with a MaaS transport service. The publisher node may include, for example, a booking application, a ticketing gate, or a Point-of-Sale (PoS) device of the transportation provider.

Before the transaction request is delivered to the subscriber node, the API gateway may apply a set of security rules on the routed transaction request to validate the transaction request. The subscriber node of the transportation provider may be associated with a node of a distributed ledger (e.g., a Blockchain-based ledger), which may store state objects that may include transaction data of the MaaS transport service. The node of the distributed ledger may receive the validated transaction request and may update the transaction data stored on the node of the distributed ledger based on the received transaction request.

Figure 1:
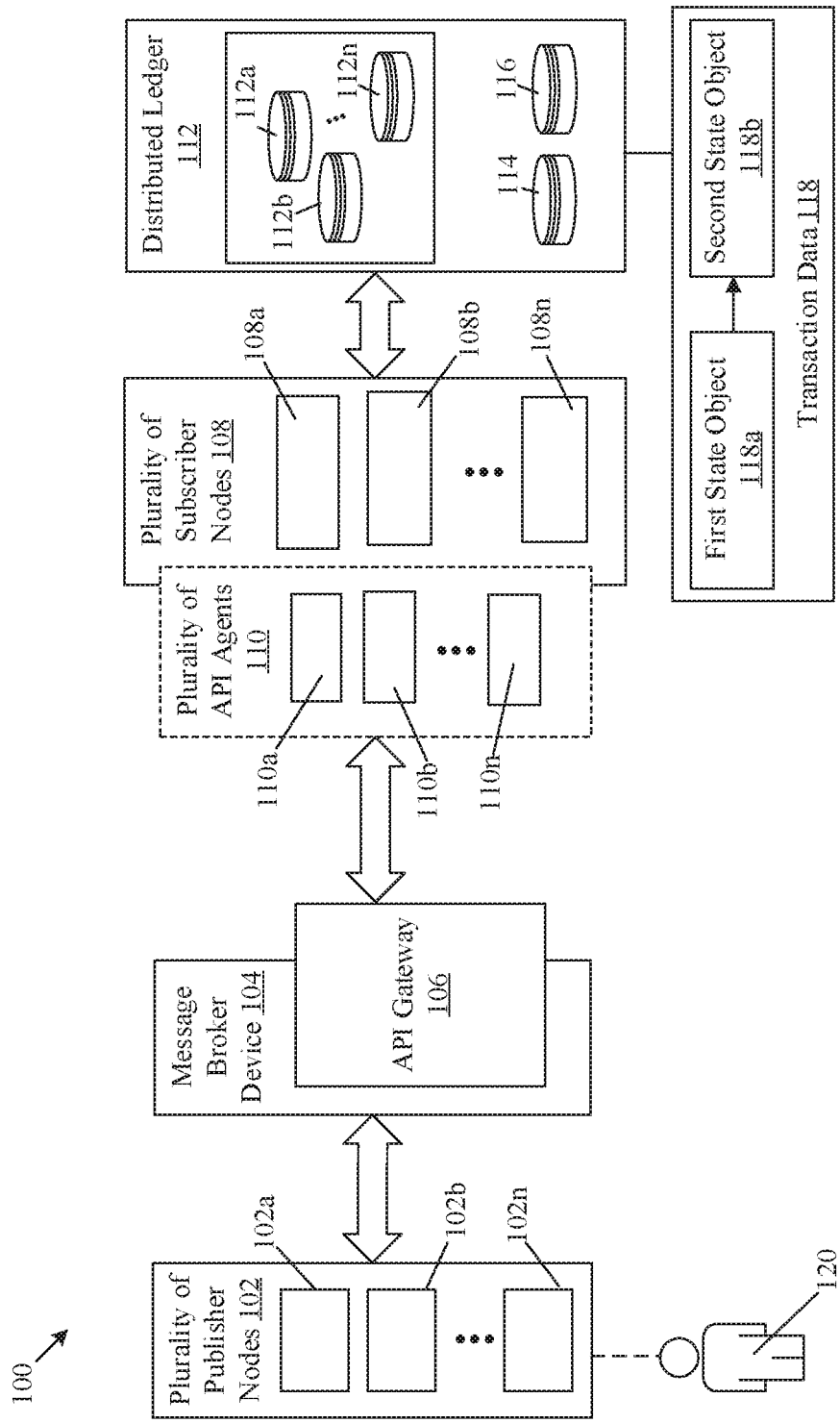
FIG. 1 is a diagram of an exemplary network environment for implementation of transaction security on a Mobility-as-a-Service (MaaS) platform, in accordance with an embodiment of the disclosure.

FIG. 1 is a diagram of an exemplary network environment for implementation of transaction security on a Mobility-as-a-Service (MaaS) platform, in accordance with an embodiment of the disclosure. With reference to FIG. 1, there is shown a network environment 100. The network environment 100 includes a first publisher node 102a, a second publisher node 102b, and an nth publisher node 102n (hereinafter, collectively referred to as a plurality of publisher nodes 102) associated with a plurality of transportation providers of a MaaS transport service.

The network environment 100 may further include a message broker device 104 that may host an Application Programming Interface (API) gateway 106. The network environment 100 may further include a first subscriber node 108a, a second subscriber node 108b, and an nth subscriber node 108n (hereinafter, collectively referred to as a plurality of subscriber nodes 108) associated with the plurality of transportation providers. The number of the publisher nodes, the API agents, and the subscriber nodes in FIG. 1 are merely presented as example. The present disclosure may also be applicable to more or lesser number of the publisher nodes, the API agents, and the subscriber nodes, without a deviation from the scope of the disclosure.

The message broker device 104 may be configured to communicate with each of the plurality of publisher nodes 102 and each of the plurality of subscriber nodes 108 through a suitable publish-subscribe network protocol, such as, but not limited to, a Message Queuing Telemetry Transport (MQTT)-based messaging protocol, an Advanced Message Queuing Protocol (AMQP)-based messaging protocol, or a Message-Oriented Middleware (MOM)-based messaging framework.

Each of the plurality of subscriber nodes 108 may host a corresponding API agent from a plurality of API agents 110 to provide an interface between a corresponding subscriber node and the API gateway 106. For example, the first subscriber node 108a may host a first API agent 110a, the second subscriber node 108b may host a second API agent 110b, and the nth subscriber node 108n may host an nth API agent 110n.

Each of the plurality of subscriber nodes 108 may be associated with a corresponding node of a distributed ledger 112. For example, the first subscriber node 108a may be associated with a first node 112a, the second subscriber node 108b may be associated with a second node 112b, and the nth subscriber node 108n may be associated with an nth node 112n.

The network environment 100 may further include a counter-party node 114 and a consensus node 116, each of which may be associated with the distributed ledger 112. For example, the distributed ledger 112 may include the counter-party node 114 (also referred to as a MaaS provider node) and the consensus node 116. In an embodiment, at least two nodes of the distributed ledger 112 may store transaction data 118 associated with a transport service. The transport service may be associated with one or more of the plurality of transportation providers and/or a user 120 who may avail the transport service through a unified MaaS interface or the plurality of publisher nodes 102.

For example, the transaction data 118 may include a set of state objects, such as a first state object 118a (also referred to as an initial state object) and a second state object 118b (i.e. which corresponds to an updated version of the initial state object). Each state object may store a version of the transaction data 118, which may include a smart contract, a contract code (or rules of a transaction upon which parties to the transaction agree), and state properties (that may be updated when the transaction data 118 is updated based on transaction requests from publisher nodes).

Each publisher node of the plurality of publisher nodes 102 may include suitable logic, circuitry, code, and/or interfaces that may be configured to publish transaction requests to one or more subscriber nodes of the plurality of subscriber nodes 108 through the message broker device 104. Each publisher node may publish a transaction request based on occurrence of an event associated with a MaaS transaction (such as a creation, a start, or an end of a transport service associated with a trip consisting of services of one or more transport providers). Examples of the plurality of publisher nodes 102 may include, but are not limited to, a ride booking app, a ticketing gate, or a Point-of-Sale (PoS) device, associated with a publisher node.

In an embodiment, each of the plurality of publisher nodes 102 may be installed at a transport service terminal associated with a transportation provider. The transport service interface of the transport service terminal may correspond to a user interface that may trigger an event associated with the MaaS transaction based on a user input from the user 120.

By way of example, and not limitation, the first publisher node 102a may provide a user interface, through which the first publisher node 102a may receive a user input from a user 120. The received user input may indicate a request for a creation of a MaaS-based transport service for the user 120. In response to such received user input, the first publisher node 102a may generate a transaction request that may include a create message associated with a creation of the MaaS-based transport service for the user 120. Alternatively, when the user 120 initiates a MaaS-based transport service, the first publisher node 102a may generate a transaction request that may include a get-in message that may correspond to a start of the MaaS-based transport service for the user 120. As an example, such initiation of the MaaS-based transport service may be associated with an event detection, such as when the user 120 enters through a railway ticketing gate (the first publisher node 102a) to board a train (associated with a transportation provider) or when a cab ride is started. Alternatively, when the user 120 completes a usage of a MaaS-based transport service, the first publisher node 102a may generate a transaction request that may include a get-out message that may correspond to a completion of the MaaS-based transport service for the user 120. As an example, such completion of the MaaS-based transport service may be associated with an event detection, such as when the user 120 exits through an electronic railway exit gate (the first publisher node 102a) after disembarking from a train (associated with a transportation provider) or when a cab ride ends.

The message broker device 104 may include suitable logic, circuitry, code, and/or interfaces that may be configured to route transaction requests from the plurality of publisher nodes 102 to the plurality of subscriber nodes 108. The message broker device 104 may be further configured to host the API gateway 106 to perform security filtering of the routed transaction requests. For example, the message broker device 104 may receive a first transaction request associated with a multimodal transport service from the first publisher node 102a of a first transportation provider. Further, the message broker device 104 may route, via the API gateway 106, the first transaction request to the first subscriber node 108a of the first transportation provider. Examples of the message broker device 104 may include, but are not limited to, an application server, a cloud server, a mainframe server, a database server, a file server, a web server, or other type of servers.

The API gateway 106 may include suitable logic, code, and/or interfaces that may be configured to apply a set of security rules on the transaction requests routed by the message broker device 104. The API gateway 106 may validate the transaction requests based on the application of the set of security rules and may forward the validated transaction requests to one or more subscriber node(s). As an example, the API gateway 106 may be configured to validate the routed first transaction request from the first publisher node 102a based on the application of the set of security rules on the received first transaction request. Based on the validation of the first transaction request, the API gateway 106 may forward the first transaction request to the first subscriber node 108a or drop the first transaction request in case the first transaction request fails validation. As another example, the API gateway 106 may be configured to hold transaction requests routed to the first subscriber node 108a based on an operational state (e.g., active/inactive state) of the first subscriber node 108a. Further, the API gateway 106 may re-route the transaction requests held by the API gateway 106 to the first subscriber node 108a based on a determination that the operational state of the first subscriber node 108a is active. In one embodiment, the API gateway 106 may be implemented as a software application that may be deployed or hosted on the message broker device 104.

Each of the plurality of subscriber nodes 108 may include suitable logic, circuitry, code, and/or interfaces that may be configured to receive transaction requests from one or more publisher nodes of the plurality of publisher nodes 102. For example, the first subscriber node 108a of the first transportation provider may register with the message broker device 104 and subscribe to receive the transaction requests from the first publisher node 102a of the same transportation provider (i.e., the first transportation provider). In such a scenario, a transaction request published by the first publisher node 102a may be routed by the message broker device 104, via the API gateway 106 which may validate the transaction request before routing the transaction request to the first subscriber node 108a. Examples of implementation of a subscriber node may include, but are not limited to, a web server, an edge device, an edge node, a cloud server, a cluster of cloud-based servers, a workstation, or any computing device or system with a fog computing capability.

Each of the plurality of API agents 110 may include suitable logic, circuitry, code, and/or interfaces that may be configured to maintain operational state information associated with the corresponding subscriber node of the plurality of subscriber nodes 108. An API agent (such as first API agent 110a) may be configured to pass the transaction request to a corresponding subscriber node (such as the first subscriber node 108a) if the transaction request complies with information access policies (e.g., business rules or constraints) of a transportation provider associated with the subscriber node. Each API agent may be implemented as a server-based application on a subscriber node or on another node (e.g., edge node) communicatively coupled to the subscriber node.

In an embodiment, the distributed ledger 112 may be a decentralized and distributed database system that may maintain an immutable record of data operations or transactions. A set of data operations may be grouped together as a block and may be further linked to a previous block of data operations to form a chain of a plurality of blocks. All blocks of data operations may be stored in a decentralized manner, whereby at least two participants or nodes of the distributed ledger 112 may store a sub-set of the plurality of blocks associated with one or more transactions in which the at least two participants or nodes may participate. Further, the distributed ledger 112 may include an operating system (for example, a Java Virtual Machine (JVM)) which may allow for deployment of a smart contract between multiple parties, for example, mobility provider node(s) (also referred to as a transportation provider node, such as the first node 112a of the first transportation provider) and the counter-party node 114 (i.e. the MaaS provider node).

By way of example, and not limitation, the distributed ledger 112 may be a Corda blockchain, an Ethereum blockchain, or a Hyperledger blockchain. The distributed ledger 112 (for example, the Corda blockchain) may store a set of immutable state objects that can be tracked by the distributed ledger 112. The state object may include transaction data, such as a smart contract between parties, contract code (rules of transaction), and content including state properties with certain state values. The smart contract may include a set of conditions under which multiple parties to the smart contract may agree to interact with each other. The smart contract may run on one or more nodes of the distributed ledger 112 and may govern transitions between state objects to generate a transaction. The smart contract may be written once, reused for a large numbers of state objects, and may refer to a governing legal prose by way of cryptographic hashes.

The distributed ledger 112 may use secure cryptographic hashes to identify parties and data and also to link a state object to a previous version of the state object to provide chains of provenance. A transaction between a group of parties may be stored on the distributed ledger 112 such that only the group of parties associated with the transaction may be able to view the transaction. A party associated with a transaction may store a current state object of the transaction in a vault (a database associated with the distributed ledger 112). Another party eligible to view or process the transaction (e.g., validate the transaction) may retrieve the current state object of the transaction from the vault. Additionally, each state object of the distributed ledger 112 may include a smart contract between the parties or nodes that may participate in an associated transaction.

On the distributed ledger 112, a participant or a node (for example, the first node 112a) may update a transaction by updating state properties of an input state object (for example, the first state object 118a) to produce an output state object (for example, the second state object 118b). The updated transaction may thereby create a chain of provenance (which may be associated with the transaction data 118). The distributed ledger 112 may provide a consensus for the updated transaction based on a determination of a validity of the updated transaction and a determination of a uniqueness of the updated transaction. In an embodiment, the participants of nodes associated with the updated transaction may determine the validity of the updated transaction by an independent execution of smart contracts and validation logic associated with the transaction. Further, a consensus node (e.g., the consensus node 116) associated with the distributed ledger 112 may determine the uniqueness of the updated transaction based on a check that there exists no other transaction that has reached a consensus by use of the same input state object as the current transaction.

In accordance with an embodiment, the distributed ledger 112 may be associated with a decentralized application that may include a client-side interface (a front-end) and a server-side interface (a back end). The decentralized application may be configured to implement a workflow (e.g., Corda flow as discussed in FIG. 6) associated with the blockchain to record a transaction on a node of the distributed ledger 112 (such as the first node 112a of the distributed ledger 112). The client-side interface may be hosted on each of the plurality of subscriber nodes 108 and the client-side interface may be configured to load up on a client associated with a subscriber node. For example, the client-side interface of the decentralized application may be a Remote Procedure Call (RPC) client that may be configured on each subscriber node and the counter-party node 114 (i.e. the MaaS provider node). The server-side interface of the decentralized application may run on each node of the distributed ledger 112 associated with a corresponding subscriber node and the counter-party node 114.

In an embodiment, the transaction request from a publisher node may initiate a MaaS transaction between a mobility provider node (such as the first node 112a of the distributed ledger 112) and a MaaS provider node (i.e. the counter-party node 114). The distributed ledger 112 may store records for the MaaS transaction between two parties, i.e., the mobility provider node (e.g., the first node 112a of the first mobility provider) and the MaaS provider node (i.e. the counter-party node 114).

In case of multiple MaaS providers, the network environment 100 may include a plurality of MaaS provider nodes, each of which may be associated with a certain MaaS provider and included in a separate distributed ledger for the respective MaaS provider. In certain scenarios, the plurality of MaaS provider nodes may be included in a common distributed ledger, such as the distributed ledger 112.

In an embodiment, the first node 112a may be one of many database nodes of the distributed ledger 112 and may be configured to receive the validated first transaction request from the API gateway 106, via the first subscriber node 108a. The first node 112a may be configured to update an initial state object (for example, the first state object 118a) associated with the distributed ledger 112 based on a transaction message in the received first transaction request to output an updated state object (for example, the second state object 118b). The first node 112a may be further configured to build a transaction that may include the initial state object (for example, the first state object 118a with initial transaction data) and the updated state object (for example, the second state object 118b with updated transaction data).

The counter-party node 114 may be associated with a MaaS provider and may be also referred to a MaaS provider node. In an embodiment, the counter-party node 114 may include suitable logic, circuitry, code, and/or interfaces that may be configured to process a transaction request received by a subscriber node of the plurality of subscriber nodes 108. The consensus node 116 may include suitable logic, circuitry, code, and/or interfaces that may be configured to notarize a transaction associated with the distributed ledger 112.

Figure 9:
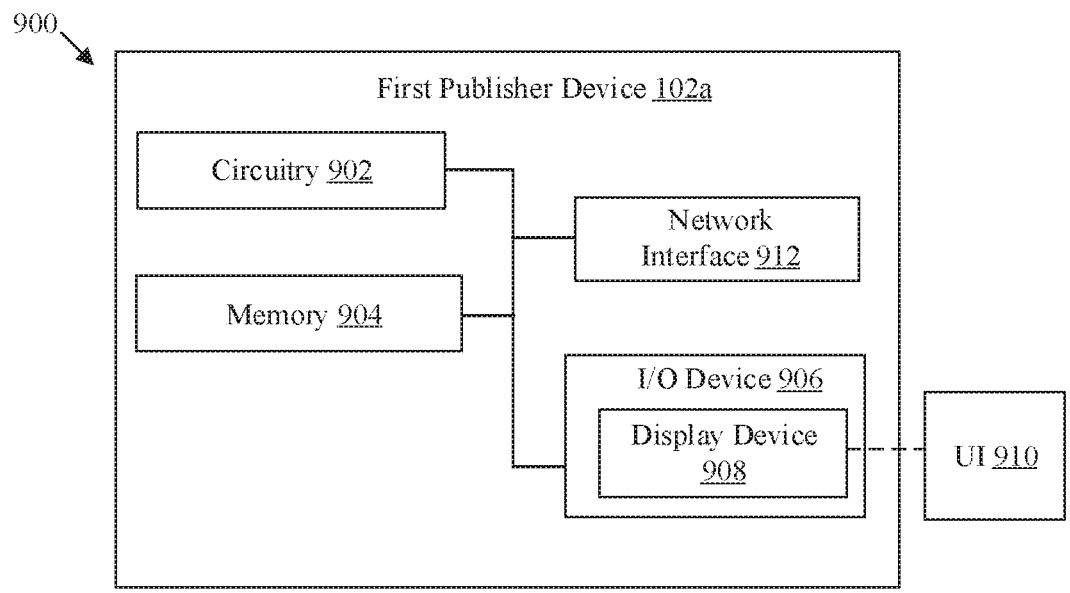
FIG. 9 is a block diagram of an exemplary publisher node, in accordance with an embodiment of the disclosure.

In operation, the first publisher node 102a of the first transportation provider may receive an input from the user 120 via a user interface (as shown in FIG. 9, for example) of the first publisher node 102a. The input may include a request to create a transport service (i.e. a MaaS service) based on a travel plan associated with the user 120. The transport service may be a combination of individual service offerings of one or more homogenous or heterogeneous transportation providers. For example, a ticketing gate, a ride hailing app, or a PoS terminal of a MaaS provider may receive a request for creation of a multimodal transport service (e.g., a combination of bus, cab, and flight) from the user 120 via the input. Herein, the multimodal transport service may include, for example, a train service, a bus service, a taxi/cab service, a metro rail service, an air-plane service, a fleet service, a ride hailing service, a car sharing service, a carpool service, a car rental service, a bike sharing service, or a combination thereof.

In an embodiment, the first publisher node 102a may be configured to generate a first transaction request based on the input from the user 120. The first transaction request may include a transaction message that may correspond to a create message. For example, the create message may include details of transportation providers, travel plan/route associated with a transport service, a source location, a destination location, or intermediate locations between the source location and the destination location. The create message may also include payment details associated with the entire bundle of transport services booked by the user 120.

The first publisher node 102a may transmit the first transaction request including the create message at all subscriber nodes that may be associated with the transport service of transportation providers (e.g., bus, cab, and flight). Based on the reception of the create message at the subscriber nodes of associated transportation providers, the corresponding nodes of the distributed ledger 112 may create an initial state object and store the initial state object on the distributed ledger 112.

In another embodiment, when the transport service is started for the user 120, a publisher node (such as the first publisher node 102a) associated with a transportation provider may transmit a transaction request that may include a get-in message to a subscriber node (such as the first subscriber node 108a) of the transportation provider through the message broker device 104.

In another embodiment, when the transport service is completed for the user 120, the publisher node (such as the first publisher node 102a) may transmit a transaction request that may include a get-out message to the subscriber node (such as the first subscriber node 108a).

The first publisher node 102a may be configured to transmit the first transaction request to the message broker device 104. The message broker device 104 may be configured to receive the transaction request from the first publisher node 102a and route the first transaction request to the first subscriber node 108a of the first transportation provider, via the API gateway 106. The API gateway 106 may be configured to validate the routed first transaction request based on application of the set of rules on the received first transaction request. For example, the API gateway 106 may perform security filtering on the received first transaction request based on a determination of whether the first transaction request has a valid signature, is associated with a legitimate IP address, does not correspond to a malicious behavior associated with a cyberattack, and/or is not sent by a bot. The security filtering provided by the API gateway 106 may ensure that only legitimate transaction requests are passed to subscriber nodes. With the security filtering at the broker end, each individual subscriber node may be able to skip checks to filter illegitimate transaction requests, resulting in better message/transaction handling capacity. The API gateway 106 (or the message broker device 104) may be configured to transmit the first transaction request to the first subscriber node 108a based on the validation of the first transaction request. The API gateway 106 may also provide a control mechanism to enable, disable, or monitor transaction request traffic.

In an embodiment, the first API agent 110a may be configured to receive the validated first transaction request from the API gateway 106. The first API agent 110a may determine whether the validated first transaction request complies with information access policies of a transportation provider associated with the first subscriber node 108a. The information access policies may correspond to business rules or constraints of the transportation provider. The first API agent 110a may pass the validated first transaction request to the first subscriber node 108a if the validated first transaction request complies with the information access policies. Thus, transportation provider-specific or subscriber node-specific filtering of transaction requests may be implemented through the first API agent 110a.

The first subscriber node 108a may be configured to receive the validated first transaction request from the first API agent 110a and transmit the validated first transaction request to the first node 112a. The first node 112a may retrieve the first state object 118a for the transport service and may update the transaction data included in the first state object 118a based on the received first transaction request. The transaction data may be associated with information, such as, but not limited to, ticketing information, subscription information, payment information, revenue sharing information, or transport service information.

In an exemplary scenario, a transport service may be created for a scheduled travel plan of the user 120 to ride a bus at 11:00 AM to airport, board a flight at 1:00 PM from the airport, followed by a cab ride at 8:00 PM from the airport to a hotel. For the bus ride, when the user 120 starts the bus ride, a publisher node associated with the bus ride provider may transmit a transaction request to a subscriber node of the bus ride provider. The transaction request may include a get-in message including details of trip (such as a pickup or drop location, a pickup time, etc.), subscription details, or user details. When the user 120 deboards the bus at end of journey, the publisher node associated with the bus ride provider may again transmit a transaction request to the subscriber node of the bus ride provider. The transaction request may include a get-out message including trip details (such as a trip time, drop location, etc.), subscription details, trip bill, or user details. For each of the get-in message or the get-out message, the subscriber node may pass the get-in message or the get-out message to its node of the distributed ledger 112. The node of the distributed ledger 112 may update the initial state object to produce a new state object with updated transaction data based on the get-in message or the get-out message.

For example, if the state properties of the initial state object include a total paid amount of 500 US Dollars (USD) for the (multi-trip) transport service, then the updated transaction data of the new state object may include the total paid amount and a billed amount of 10 USD for the trip associated with the bus ride provider. Similarly, for all other trips (flight and cab to hotel) of the transport service, respective nodes of the distributed ledger 112 for the flight provider and the cab ride provider may update the new state object sequentially in the order in which the user 120 may complete a trip with the flight and a trip with the cab. At the end of the last trip, the counter-party node 114 (i.e. the MaaS provider node) may read a state object (whichever is last updated) to settle payments for each of the bus ride provider, flight provider, and the cab ride provider.

In described embodiments, the transport service may be provided by homogeneous transport providers (e.g., multiple cab ride provider companies) or heterogenous transport providers (multimodal transport providers) through a homogenous group of devices, applications, or ticketing gates, or a heterogenous group of ticketing gates, applications, and PoS devices of various transportation providers.

Each transportation provider may enjoy secure data ownership of the transaction data 118 through the distributed ledger 112. Since, the MaaS platform of the disclosure is implemented using the distributed ledger 112, each transportation provider may own a node on the distributed ledger 112. The node of the distributed ledger 112 associated with a transportation provider may store transaction data relevant to the transportation provider. The counter-party node 114 (i.e. the MaaS provider node) may also store the same transaction data. This may ensure secure ownership of data amongst the MaaS provider and the transportation providers. This may also enhance connectivity between the various transportation providers. With sharing of Information Technology (IT) amongst the transportation providers, costs associated with owned IT infrastructure for each transportation provider may be less as compared to costs when each transport provider maintains its own closed-platform IT infrastructure. The distributed ledger 112 may facilitate ticketing management, subscription management, payment management, revenue sharing, and/or transport service management for multiple transportation providers based on transaction data records on the distributed ledger 112.

Figure 2:
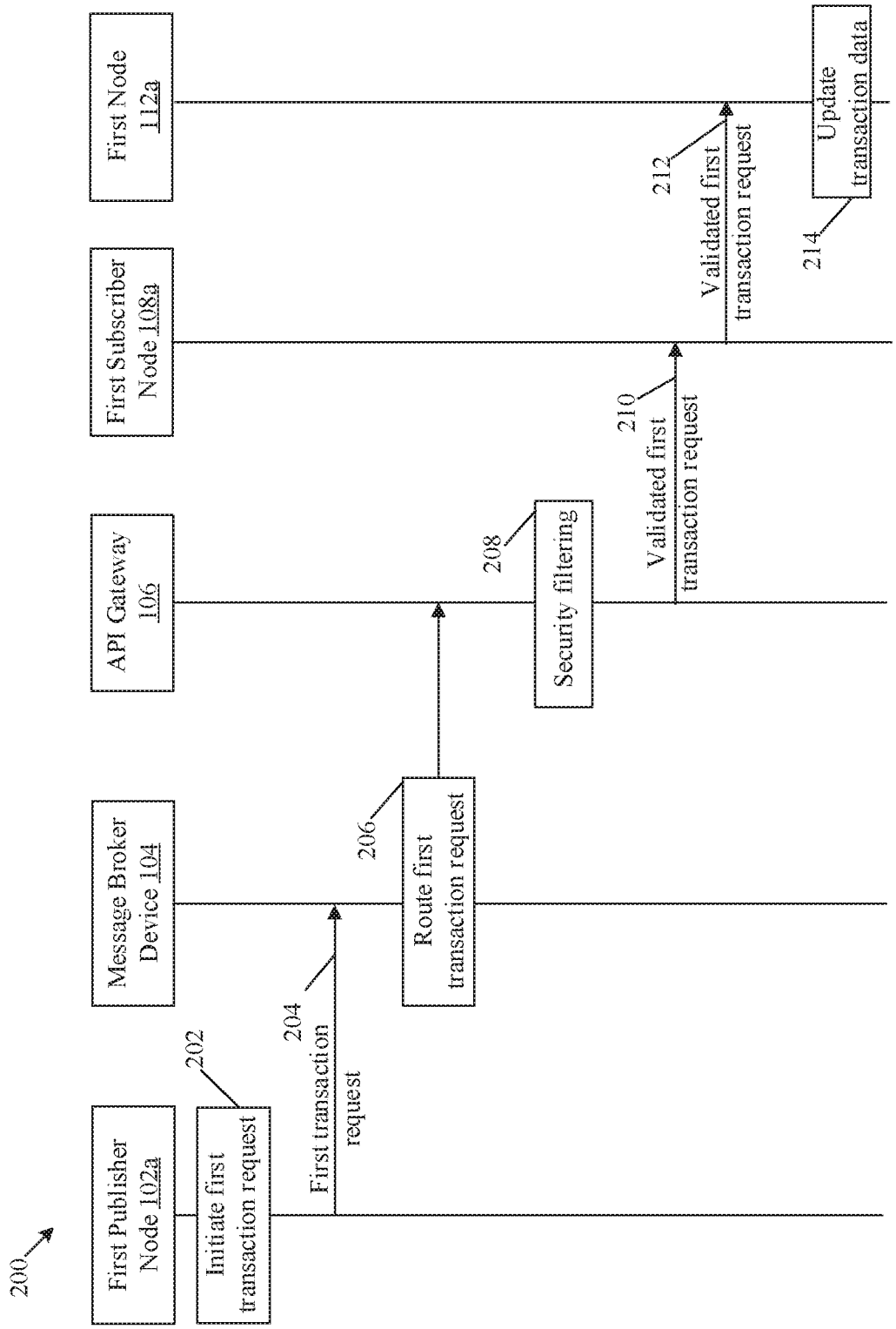
FIG. 2 is a sequence diagram that illustrates exemplary operations for update of transaction data on a node of a distributed ledger based on a transaction request from a publisher node, in accordance with an embodiment of the disclosure.

FIG. 2 is a sequence diagram that illustrates exemplary operations for update of transaction data on a node of a distributed ledger based on a transaction request from a publisher node, in accordance with an embodiment of the disclosure. FIG. 2 is explained in conjunction with elements from FIG. 1. With reference to FIG. 2, there is shown a sequence diagram 200 that illustrates a sequence of operations from 202 to 212. The sequence of operations may be executed by various elements of the network environment 100, such as, but not limited to, by the first publisher node 102a, the message broker device 104, the API gateway 106, the first subscriber node 108a, or the first node 112a of the distributed ledger 112.

At 202, the first publisher node 102a of a first transportation provider may initiate a first transaction request. In an embodiment, the first publisher node 102a may receive an input from the user 120 through a UI of the first publisher node 102a. The input may include a request for initiation (or a creation) of a transaction associated with a transport service. For example, the input may include a request of the user 120 to combine individual service offerings of one or more transportation providers (for example, a taxi service provider, a bus service provider, and a metro rail service provider) to travel from a first location to a second location. Based on such an input from the user 120, the first publisher node 102a may be configured to generate the first transaction request that may include a create message. For example, the create message (e.g., a first instance of a record) may include travel plan/route associated with the transport services such as, a source location, a destination location, and intermediate locations between the source and the destination location. The create message may also include payment details associated with the entire bundle of transport services booked by the user 120. The create message may be used to create an initial state object on the distributed ledger 112. An example of fields of the create message is listed in Table 1, as follows:

TABLE 1

Exemplary fields of a create message and their descriptions

| Create Message (a first instance of a record) Fields | Description |
| --- | --- |
| Mode | Mode of transaction - subscription/pass |
| Transaction Type | Type of transaction - create message |
| Pass/Subscription ID | ID of pass/subscription for MaaS service |
| Subscription Status | Type of subscription held by a user |
| Transportation Provider(s) | Name of transportation provider(s) |
| Transaction Time | Time of transaction |
| Party | MaaS provider name to whom transactions may be made |
| One Time Pass/Subscription ID | One time ID for pass or subscription |
| Location | Location of transaction, in case station ID is absent |
| Station ID | Station ID of transaction, in case location is absent |

In Table 1, the create message includes a mode of transaction, which may be one of a "pass" transaction (where the user 120 may have a single trip ticket for the transport services) or a "subscription" transaction (where the user 120 may have a paid subscription with the MaaS provider for use of the transport services for a certain time interval). The transaction type field may indicate that the first transaction request corresponds to a create message. The pass/subscription ID field may indicate the ID of the pass or subscription of the user 120, while subscription status field may indicate a status (e.g., expired/active) of the subscription held by the user 120. The create message may also include names of transportation providers who may be associated with the created MaaS service and name of the MaaS provider to whom transactions may be made. Further, the create message may include transaction time (i.e., time stamp of the create message), a one-time ID for pass or subscription, location of the transaction, and station ID of the transaction (in case the location field is absent).

In one scenario, when a trip associated with the first transportation provider is initiated, the first publisher node 102a of the first transportation provider may transmit to the message broker device 104, a first transaction request that may include a get-in message for the first subscriber node 108a. For example, the transport service may correspond to a scheduled plan of the user 120 to ride a bus at 11:00 AM to airport, board a flight at 1:00 PM and ride a cab at 8:00 PM. When the user 120 starts the cab ride, a publisher node associated with the cab provider may generate a transaction request with a corresponding get-in message associated with the cab provider. The get-in message may include details such as a start time of the cab journey and a current location of the cab. The get-in message may be used to create an updated state object based on the first transaction request of the first transportation provider (e.g., a cab service provider) on an associated node of the distributed ledger 112. An example of fields of the get-in message is listed in Table 2, as follows:

TABLE 2

Exemplary fields of a get-in message and their descriptions

| Create Message Field | Description |
| --- | --- |
| Mode | Mode of transaction - subscription/pass |
| Transaction Type | Type of transaction - get-in message |
| Pass/Subscription ID | ID of pass/subscription for MaaS service |
| Subscription Status | Type of subscription held by a user |
| Transportation Provider | Name of transportation provider |
| Transaction Time | Time of transaction |
| Party | MaaS provider name to whom transaction may be made |
| One Time Pass/Subscription ID | One time ID for pass or subscription |
| Location | Location of transaction, in case station ID is absent |
| Station ID | Station ID of transaction, in case location is absent |

Exemplary fields of Table 2 are similar to the fields illustrated in Table 1. Therefore, a description of such exemplary fields is omitted from the disclosure for the sake of brevity.

In a scenario where the trip associated with the first transportation provider ends, the first publisher node 102a (or another publisher node of the first transportation provider) may initiate a transaction request that may include a get-out message. With reference to the above example of the transport service, when the user 120 deboards the cab at end of the cab journey, the publisher node associated with the cab provider may generate a transaction request with a corresponding get-out message associated with the cab provider. The get-out message may include details such as a completion time of the cab journey and a current location (i.e., a destination) of the cab. The get-out message may be used to create another updated state object associated with the transaction request of the first transportation provider (e.g., the cab service provider) on the associated node of the distributed ledger 112. An example of fields of the get-out message is listed in Table 3, as follows:

TABLE 3

Exemplary fields of a get-out message and their descriptions

| Create Message Field | Description |
| --- | --- |
| Mode | Mode of transaction - subscription/pass |
| Transaction Type | Type of transaction - get-out message |
| Pass/Subscription ID | ID of pass/subscription for MaaS service |
| Subscription Status | Type of subscription held by a user |
| Transportation Provider | Name of transportation provider |
| Transaction Time | Time of transaction |
| Party | MaaS provider name to whom transaction may be made |
| One Time Pass/Subscription ID | One time ID for pass or subscription |
| Location | Location of transaction, in case station ID is absent |
| Station ID | Station ID of transaction, in case location is absent |

Exemplary fields of Table 3 are similar to the fields illustrated in Table 1. Therefore, a description of such exemplary fields is omitted from the disclosure for the sake of brevity.

At 204, the first publisher node 102a may transmit the first transaction request to the message broker device 104. The message broker device 104 may receive the first transaction request from the first publisher node 102a.

At 206, the message broker device 104 may route the first transaction request to the first subscriber node 108a of the first transportation provider, via the API gateway 106. In an embodiment, each of the plurality of subscriber nodes 108 may subscribe to one or more transaction requests by transmission of associated subscription request to the message broker device 104. For example, in case of MQTT messages as transaction requests, a subscriber node may subscribe to a certain topic to receive transaction requests that include that topic. Further, a publisher node may publish or transmit messages as transaction requests to certain topics at the message broker device 104. A topic may correspond to a subject of a MQTT message that may indicate a type of a content of the message and may be used to address and route the MQTT message. The message broker device 104 may route the first transaction request based on the information in the transaction message included in the first transaction request and the subscription requests received from the plurality of subscriber nodes 108 via the API gateway 106.

For example, in Table 1, the transaction message included in the first transaction request indicates a name of the transportation provider (for example, the first transportation provider). In case the first subscriber node 108a subscribes to transaction requests associated with the first transportation provider (e.g., a cab provider), the message broker device 104 may route the first transaction request to the first subscriber node 108a of the first transportation provider (i.e., the cab provider), via the API gateway 106.

At 208, the API gateway 106 may perform security filtering of the routed first transaction request to validate the transaction request. For the security filtering, the routed first transaction request may be checked for validity based on a set of security rules, as described herein.

The set of security rules may include a first rule to check whether a transaction request is associated with an IP address amongst a valid range of IP addresses. The set of security rules may further include a second rule to check whether a transaction request corresponds to a malicious behaviour associated with a cyberattack and a third rule to check whether a publisher node, from which a transaction request is received, is a bot. The set of security rules may include a fourth rule to check whether message signature associated with a transaction request is valid and a fifth rule to validate a transaction request based on a verification of an authenticity and an authorization of a client (i.e., a publisher node) to submit the transaction request to a mobility provider (such as the first node 112A) based on an associated unique ID, IP address, or access token. The application of the set of security rules in the above order (from the first rule to the fifth rule) may be beneficial as it may lead to security filtering of transaction requests on various Open Systems Interconnection (OSI) model layers, such as a network layer, followed by a transport/session layer, and a presentation/application layer.

In one embodiment, the API gateway 106 may be configured to validate the routed first transaction request based on a determination that the routed first transaction request is associated with an IP address amongst a valid range of IP addresses. For example, the first publisher node 102a may embed a source IP address associated with the first publisher node 102a in the transaction message of the first transaction request. The API gateway 106 may maintain a range of valid whitelisted IP addresses, which may be associated with the plurality of transportation providers. The routed first transaction request may be validated if the source IP address associated with the first publisher node 102a is within the range of valid whitelisted IP addresses.

In another embodiment, the API gateway 106 may be configured to drop the routed first transaction request based on a determination that the routed first transaction request corresponds to a malicious behaviour associated with a cyberattack. As one example, the API gateway 106 may determine whether the first transaction request corresponds to a Denial of Service (DoS) attack based on a high frequency of receipt of transaction request (including the first transaction request) from the first subscriber node 108a within a certain time period. As another example, the API gateway 106 may determine whether the first transaction request corresponds to a Cross-site Request Forgery (XSRF) attack based on parameters associated with the first transaction request. Examples of such parameters may include, but are not limited to, Uniform Resource Locators (URLs), message headers, or cookies associated with the first transaction request. If the first transaction request is determined to be associated with the DoS attack or the XRSF attack, the API gateway 106 may drop the first transaction request. Additionally, in some embodiments, the API gateway 106 may add the first publisher node 102a (or an associated client ID or IP address range) to a list of blacklisted publishers, each of which may be barred from publishing messages (or transaction requests) to the message broker device 104.

In another embodiment, the API gateway 106 may be configured to drop the routed first transaction request based on a determination that the first publisher node 102a is a bot. For example, the API gateway 106 may use an intrusion detection system to detect whether the first publisher node 102a associated with the first transaction request is a bot. The intrusion detection system may use one or more of an anomaly-based intrusion detection technique, a signature-based intrusion detection technique, or a Domain Name Service (DNS)-based intrusion detection technique to detect that the first publisher node 102a is a bot.

In another embodiment, the API gateway 106 may detect whether the first publisher node 102a is a bot by use of a challenge-response based bot detection technique. For example, the message broker device 104 may share a unique code with each publisher node when the respective publisher node initially registers or opens a TCP/IP port with the message broker device 104. When the first transaction request is received, the API gateway 106 may transmit a challenge question requesting the unique code to the first publisher node 102a. In case the first publisher node 102a associated with the first transaction request is unable to reply with the unique code, the API gateway 106 may determine that the first publisher node 102a is a bot.

In one embodiment, the API gateway 106 may be configured to validate the routed first transaction request based on a determination that the routed first transaction request is signed with a valid signature. For example, the first publisher node 102a may sign the first transaction request with a signature (e.g., a message authentication code or checksum) using a private key associated with the first publisher node 102a. The API gateway 106 may validate the signature based on a public key associated with the first publisher node 102a. The public key may be known to the API gateway 106 and/or the message broker device 104. Such validation may ensure that the first transaction request (including the transaction message) is not tampered with by a malicious entity.

In one embodiment, the API gateway 106 may be configured to validate the routed first transaction request based on verification of the authenticity and authorization of a client (i.e., a publisher node, such as, the first publisher node 102a) for a particular mobility/transport provider. As an example, the API gateway 106 may verify the authenticity and authorization of the first publisher node 102a that transmits the first transaction request based on a unique ID, an IP address, or an access token associated with the first transaction request. The IP address may be included as a source IP address in the first transaction request and the access token may be embedded in a header of a transaction message in the first transaction request. The API gateway 106 may be configured to verify the authorization of the first publisher node 102a based on a comparison of the IP address with a list of authorized IP addresses of publishers. Additionally, or alternatively, the API gateway 106 may also verify the authorization based on a comparison of the access token with a set of authorized access tokens issued by the API gateway 106. In an embodiment, the verification of the authorization may correspond to a verification of a sender (e.g., the first publisher node 102a) of the transaction message as an authorized sender.

In an embodiment, the unique ID may be embedded in the header of the transaction message in the first transaction request. Each transaction request may be received with a transaction message having a certain sequence number or the unique ID. The API gateway 106 may be configured to verify the authenticity of the first transaction request based on a comparison of the Unique ID of the receive transaction message with a Unique ID of a previous transaction message. In an embodiment, the verification of the authenticity may correspond to a verification of an integrity of the transaction message. The verification of authenticity and authorization of the first transaction request may be useful in scenarios where the network environment 100 includes multiple mobility providers and multiple MaaS providers.

At 210, the API gateway 106 may transmit the validated first transaction request to the first subscriber node 108a. The first transaction request may be transmitted to the first subscriber node 108a based on a result of the validation of the first transaction request (i.e. as a result of the application of the set of rules on the first transaction request).

At 212, the first subscriber node 108a may transmit the validated first transaction request to the first node 112a. The first node 112a may receive the validated first transaction request from the first subscriber node 108a.

At 214, the first node 112a may update transaction data (for example, the transaction data 118) stored on the first node 112a of the distributed ledger 112 based on the received validated first transaction request. The update of the transaction data on the first node 112a is explained further, for example, in FIG. 4.

Figure 3:
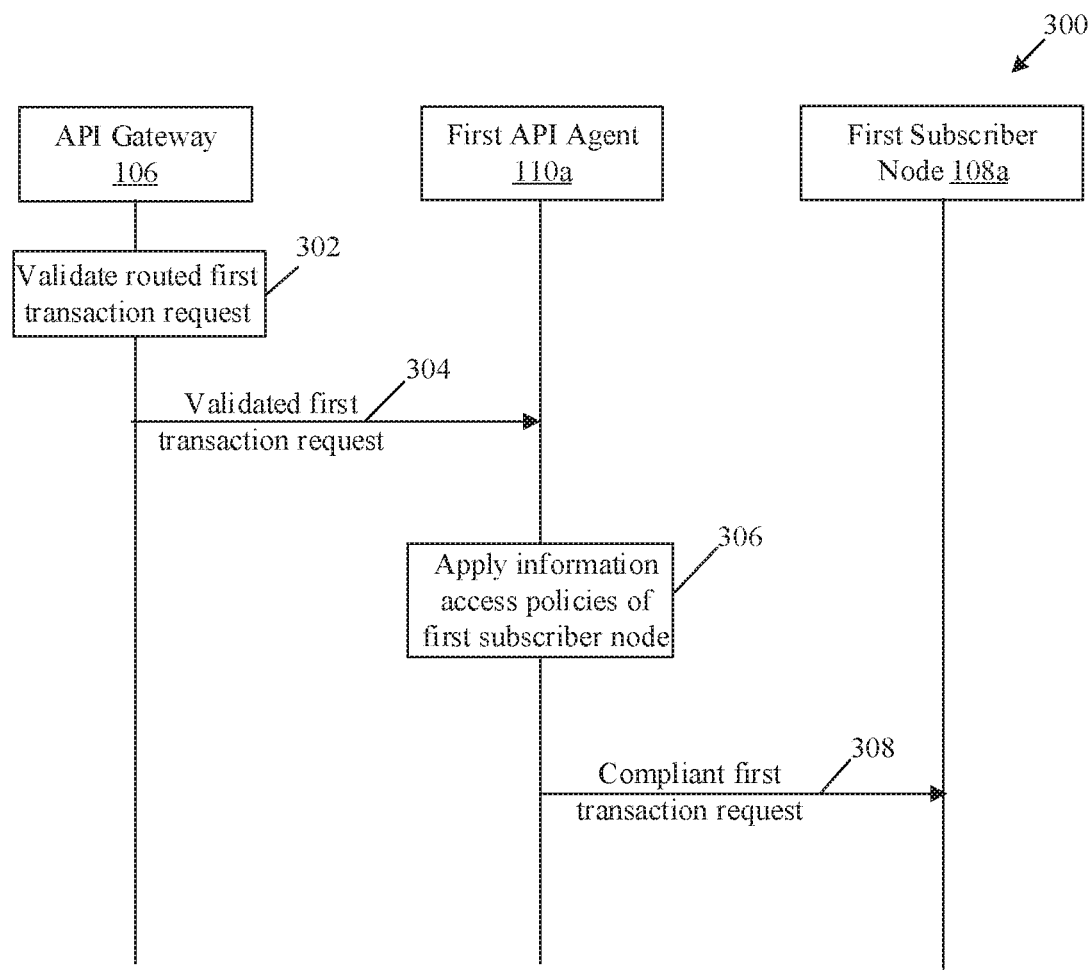
FIG. 3 is a sequence diagram that illustrates exemplary operations for application of information access policies of a subscriber node on a transaction request from a publisher node, in accordance with an embodiment of the disclosure.

FIG. 3 is a sequence diagram that illustrates exemplary operations for application of information access policies of a subscriber node on a transaction request from a publisher node, in accordance with an embodiment of the disclosure. FIG. 3 is explained in conjunction with elements from FIGS. 1 and 2. With reference to FIG. 3, there is shown a sequence diagram 300 that illustrates a sequence of operations from 302 to 308, which may be executed by various elements of the network environment 100, such as, but not limited to, by the API gateway 106, the first API agent 110a, and the first subscriber node 108a.

At 302, the API gateway 106 may validate the routed first transaction request. The validation of the routed first transaction based on application of a set of security rules on the first transaction request is explained, for example, at 208 of FIG. 2. At 304, the API gateway 106 may transmit the validated first transaction request to the first API agent 110a.

At 306, the first API agent 110a may receive the validated first transaction request from the API gateway 106 and may apply information access policies of the first subscriber node 108a on the validated first transaction request.

In an embodiment, the information access policies may include business rules and constraints associated with the transport service. By way of example, and not limitation, a first policy associated with the transport service may require the first API agent 110a to drop or hold a transaction request if the first node 112a associated with the first subscriber node 108a is under a scheduled maintenance or an unscheduled maintenance. Similarly, a second policy associated with the transport service may require the first API agent 110a to drop the transaction request if the transportation provider associated with the transaction request cancels a trip included in the transportation service.

In another embodiment, the business rules and constraints may be specific to the first transportation provider associated with the first subscriber node 108a. By way of example, and not limitation, a first business rule of the first transportation provider may require a transport service associated with a transaction request to be provided in a certain time of day or day of week during which the first transport provider operates. Similarly, a second business rule of the first transportation provider may include constraints associated with serviceable locations, a cost model, trip pricing, a payment mode, a subscription type, promotional offers, or coupons associated with a travel service provided by the first transportation provider. The first API agent 110a may check whether the transaction message is compliant with the information access policies of the first transportation provider.

At 308, the first API agent 110a may transmit the first transaction request to the first subscriber node 108a based on whether the first transaction request complies with the information access policies of the first transportation provider. The first subscriber node 108a may receive the first transaction request from the first API agent 110a.

Figure 4:
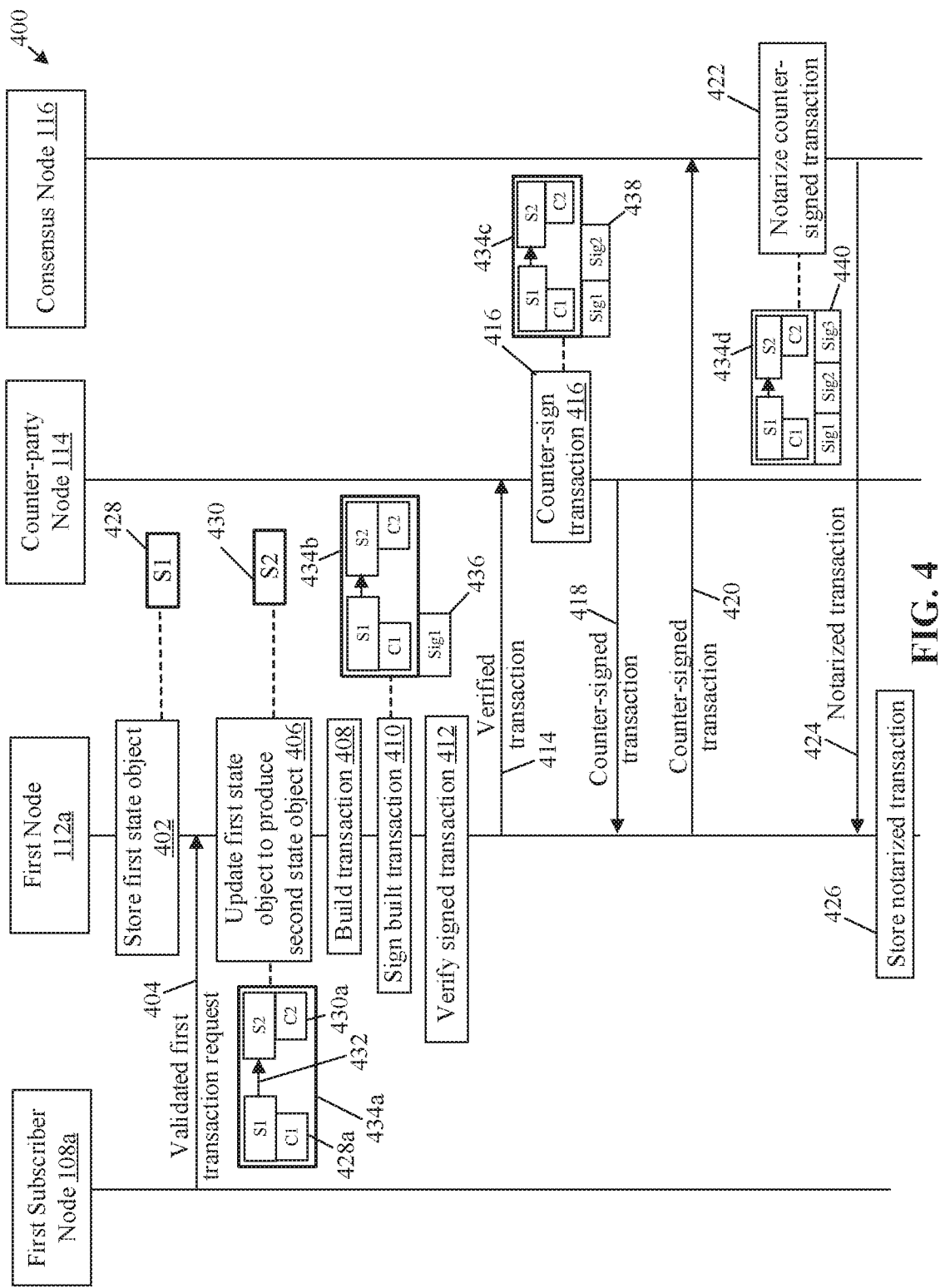
FIG. 4 is a sequence diagram that illustrates a sequence of operations for fulfillment of a transaction request through a distributed ledger, in accordance with an embodiment of the disclosure.

FIG. 4 is a sequence diagram that illustrates a sequence of operations for fulfillment of a transaction request through a distributed ledger, in accordance with an embodiment of the disclosure. FIG. 4 is explained in conjunction with elements from FIGS. 1, 2, and 3. With reference to FIG. 4, there is shown a sequence diagram 400 that illustrates a sequence of operations may be from 402 to 426, which may be executed by various elements of the network environment 100, such as, but not limited to, by the first node 112a of the distributed ledger 112, the first subscriber node 108a, the counter-party node 114, and the consensus node 116.

At 402, the first node 112a may store a first state object. In an embodiment, the first node 112a may store the first state object 428 (depicted as S1) as an initial state object including transaction data on the distributed ledger 112. For example, a transaction request that includes a create message (as also described in FIG. 2) may be initially received from the first publisher node 102a. The first publisher node 102a may transmit the first transaction request including the create message to at all relevant subscriber nodes of transportation providers (e.g., bus, cab, and flight) associated with the MaaS-based transport service. At each subscriber node that receives the first transaction request, a respective node of the distributed ledger 112 may create and store the initial state object on the respective node.

As one example, a state object may include information that identifies parties (i.e. transportation providers and the MaaS service provider) to an agreement for a (MaaS-based) transport service. The state object may further include a smart contract that may be agreeable by the parties. For each transaction request to update the state object, the smart contract may enforce rules that the transaction request must comply with for the smart contract to allow the update.

For example, one of the rules may mandate that an individual transportation provider should not bill an amount for a trip that exceeds a total payment made by a user for the entire (MaaS-based) transport service. Another rule may mandate that an individual transportation provider should not charge an amount for a trip that exceeds a balance amount which remains after trip bills of other transportation providers may be deducted from a total payment made by the user for the entire (MaaS-based) transport service. Another rule may mandate that a trip bill should be above a minimum value but below a set threshold amount to avoid erroneously generated bills from undercharging or overcharging the user for a trip. In cases where individual transport providers agree to a percentage share of a total payment made by the user 120 for the entire (MaaS-based) transport service, another rule may mandate that an individual transportation provider should not charge an amount which exceeds an amount based on the percentage share.

In one embodiment, the state object may include transaction data, such as state properties. The state properties may include details, such as payment details, trip details, trip status (e.g., trips which have been availed by the user and which are yet to be availed), ticketing information, billing information related to different transportation providers.

At 404, the first subscriber node 108a may transmit the validated first transaction request (for example, validated at 208 of FIG. 2) to the first node 112a. In at least one embodiment, the first subscriber node 108a may include a Remote Procedure Call (RPC) server that may be configured to generate a transaction call to an associated RPC client at the first node 112a. The transaction call may be generated based on a transaction message included in the validated first transaction request. For example, the transaction message may correspond to a get-in message or a get-out message.

In FIG. 4, the first subscriber node 108a is shown to handle calls to initiate transactions on the first node 112a, However, the present disclosure may not be so limiting and in some embodiment, the first subscriber node 108a may be responsible for concurrency controls, threads management, processing-resources and handling protocols associated with the first transaction request. Additionally, or alternatively, the first subscriber node 108a may be responsible for storage of route taken by users, management of ticketing information (e.g., passes and subscriptions), tracking of trips, management of user profiles, management of user tendency/preferences, and handling location-based services. In an embodiment, the stored routes, ticketing information, tracked trips of the user, and information related to location-based services may be used for future recommendation of smart routing options to the user based on user preferences and user profile.

At 406, the first node 112a may update the first state object 428 (S1) to produce a second state object 430 (depicted as S2). In an embodiment, the first node 112a may retrieve the first state object 428 (i.e., S1) from the first node 112a and produce an updated state object as the second state object 430 (i.e., S2). For example, the first transaction request may include a get-in message that may be generated when the user 120 may board a cab and start a cab journey. The first node 112a may update the initial state object (e.g., the first state object 428, depicted as S1) by update of the transaction data (e.g., the state properties) of the initial state object to produce the updated state object (e.g., the second state object 430, depicted as S2). In an example, the first node 112a may update the transaction data (e.g., the state properties) such as details related to the cab service provider, an amount to be remitted to the cab service provider and the MaaS provider for the transaction, and a current state of the transaction. The current state may include, for example, an indication that services which have been availed by the user 120 and an indication of services are yet to be availed.

At 408, the first node 112a may build a transaction 434a associated with the first transaction request. For example, to build the transaction 434a, the first node 112a may generate a transaction builder form and populate the transaction builder form with the first state object 428 (i.e., S1), a command 432, and the second state object 430 (i.e., S2). The command 432 may include instructions or code associated with a transition of the first state object 428 (i.e., S1) to the second state object 430 (i.e., S2). Each state object may include an associated smart contract. For example, the first state object 428 (i.e., S1) may include a first smart contract 428a (depicted as C1) and the second state object 430 (i.e., S2) may include a second smart contract 430a (depicted as C2).

At 410, the first node 112a may sign the built transaction 434a. In an embodiment, the first node 112a may attach a first signature 436 (depicted as Sig1) on behalf of the first node 112a (or the first transportation provider) to the built transaction 434a to produce a signed transaction 434b.

At 412, the first node 112a may verify the signed transaction 434b. In an embodiment, the first node 112a may execute both the first smart contract 428a and the second smart contract 430a. The signed transaction 434b may be verified based on a determination that a first result of the execution of the first smart contract 428a (i.e., C1) matches a second result of the execution of the second smart contract 430a (i.e., C2).

At 414, the first node 112a may transmit the verified transaction 434b to the counter-party node 114 (which is the MaaS provider node). The counter-party node 114 may receive the verified and signed transaction 434b from the first node 112a.

At 416, the counter-party node 114 may counter-sign the verified transaction 434b. In an embodiment, the counter-party node 114 may attach a second signature 438 (depicted as Sig2) on behalf of the counter-party node 114 to the verified transaction 434b to produce a counter-signed transaction 434c.

At 418, the counter-party node 114 may transmit the counter-signed transaction 434c to the first node 112a. The first subscriber node 108a may receive the counter-signed transaction 434c from the counter-party node 114.

At 420, the first node 112a may transmit the counter-signed transaction 434c to the consensus node 116. The consensus node 116 may receive the counter-signed transaction 434c from the first node 112a.

At 422, the consensus node 116 may notarize the counter-signed transaction 434c. In an embodiment, the consensus node 116 may attach a third signature 440 (depicted as Sig3) on behalf of the consensus node 116 to the counter-signed transaction 434c to produce a notarized transaction 434d.

At 424, the consensus node 116 may transmit the notarized transaction 434d to the first node 112a. The first node 112a may receive the notarized transaction 434d from the consensus node 116.

At 426, the first node 112a may store the notarized transaction 434d as a record on the first node 112a of the distributed ledger 112 to record the update of the transaction data on the distributed ledger 112. In an embodiment, the notarized transaction 434d may include updated transaction data that may be accessible to the first node 112a and the counter-party node 114. For example, the transaction data may include state properties associated with one or more of ticketing information, subscription information, payment information, revenue sharing information, or transport service information for the transport service. The MaaS provider may use the revenue sharing information in the updated transaction data to settle payments for the transportation providers.

In an embodiment, a node of the distributed ledger 112 may sign a transaction by attaching a digital signature or a cryptographic signature (based on a checksum or a public/private key which may be known to the node) to the transaction. For example, the consensus node 116 may notarize the counter-signed transaction 434c by attachment of a digital signature associated with a private key of the consensus node 116 to the counter-signed transaction 434c. Any node with the public key of the consensus node 116 may be able to verify the digital signature of the consensus node 116.

In one or more embodiments, the counter-party node 114 and the consensus node 116 may be implemented on a cloud server or an edge node. The counter-party node 114 may be used by a MaaS provider (i.e. a MaaS company) to consolidate transactions associated with the transport service provided by one or more transportation providers. Each subscriber node and the corresponding node of the distributed ledger 112 may together constitute a transportation provider node associated with the corresponding transportation provider. The transportation provider node may be implemented on a cloud server or an edge node of an IT infrastructure of a telecom facility. This may help increase transaction throughput due to presence of such nodes in a vicinity of user traffic or transaction traffic.

In FIG. 4, the sequence of operations from 402 to 426 are provided for a single transaction request to update the first state object 428. In fulfillment of a typical MaaS-based transport service, a series of transaction requests may be provided via different publisher nodes to respective subscriber nodes of transportation providers, each of which may call a transaction on a respective node of the distributed ledger 112 to update a previously updated state object (such as the second state object 430) by repeating the sequence of operations from 402 to 426.

Figure 5:
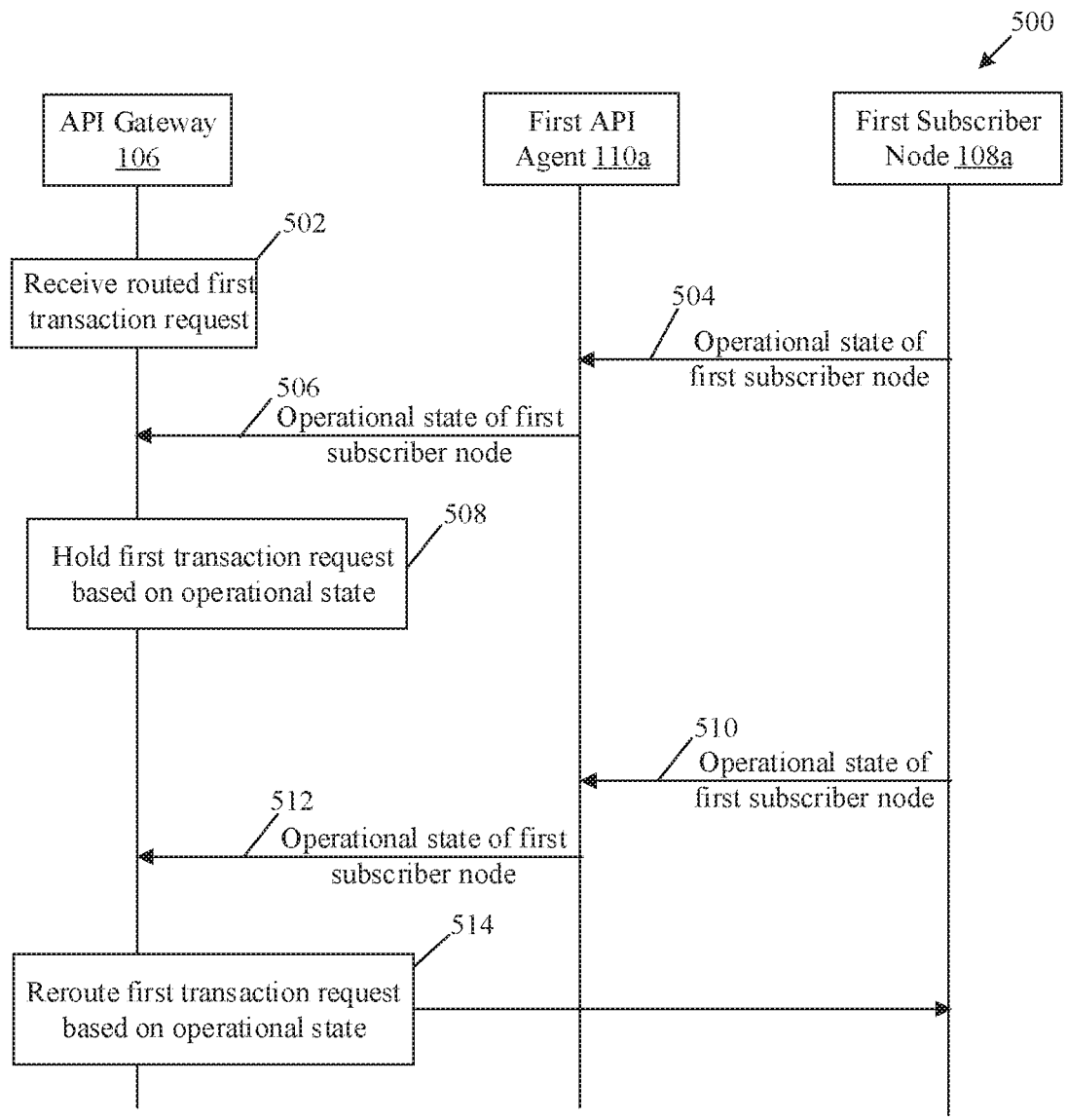
FIG. 5 is sequence diagram that illustrates a sequence of operations associated with handling of transaction requests for various operational states of a subscriber node, in accordance with an embodiment of the disclosure.

FIG. 5 is sequence diagram that illustrates a sequence of operations associated with handling of transaction requests for various operational states of a subscriber node, in accordance with an embodiment of the disclosure. FIG. 5 is explained in conjunction with elements from FIGS. 1, 2, 3, and 4. With reference to FIG. 4, there is shown a sequence diagram 400 that illustrates a sequence of operations from 502 to 510, which may be executed by various elements of the network environment 100, such as, but not limited to, by the API gateway 106, the first API agent 110a, and the first subscriber node 108a.

At 502, the API gateway 106 may receive the first transaction request (as routed at 206 of FIG. 2) from the message broker device 104. The first transaction request may be routed by the message broker device 104 to the first subscriber node 108a of the first transportation provider, via the API gateway 106.

At 504, the first subscriber node 108a may transmit its operational state to the first API agent 110a. In certain embodiments, the first API agent 110a may continuously or periodically monitor the operational state of the first subscriber node 108a and may store the operational state of the first subscriber node 108a. The operational state may include information which may be indicative of whether the first subscriber node 108a is in an active state or an inactive state. In case the first subscriber node 108a is in the inactive state, the information in the operational state may also indicate a cause/condition of the inactive state, such as a scheduled maintenance, an accidental maintenance, or an unscheduled maintenance of the first subscriber node 108a. For example, a subscriber node associated with a cab service provider may be in an inactive state due to a server firmware upgrade or a network failure. The subscriber node may also be in an inactive state due to a downtime of its associated node of the distributed ledger 112.

At 506, the first API agent 110a may transmit the operational state of the first subscriber node 108a to the API gateway 106. In an embodiment, the operational state may be transmitted based on a determination that the operational state of the first subscriber node 108a is the inactive state. The API gateway 106 may also receive operational states of other subscriber nodes of the plurality of subscriber nodes 108.

At 508, the API gateway 106 may hold the first transaction request based on the operational state of the first subscriber node 108a. For example, in case the operational state of the first subscriber node 108a is in the inactive state due to a scheduled or unscheduled maintenance, the API gateway 106 may hold or store the first transaction request. In certain embodiments, if the operational state of most or all of the nodes is inactive, the API gateway 106 may hold or drop further transaction requests from all other publisher nodes and individually inform each of such publisher nodes to stop publishing more transaction requests until the operational state of the nodes changes.

At 510, the first subscriber node 108a may transmit an updated operational state of the first subscriber node 108a to the first API agent 110a. At 512, the first API agent 110a may transmit the updated operational state of the first subscriber node 108a to the API gateway 106.

At 514, the API gateway 106 may route (or reroute) the held (or stored) first transaction request to the first subscriber node 108a based on the updated operational state of the first subscriber node 108a. For example, if the updated operational state is determined to be the active state, the API gateway 106 may re-route the first transaction request to the first subscriber node 108a.

As the API gateway 106 holds a transaction request during the inactive state of a subscriber node and re-routes the transaction request to the subscriber node when the subscriber node becomes operationally active, the delivery of the transaction request to the subscriber node is ensured in spite of planned, unplanned, or accidental maintenance of the subscriber node. In certain embodiments, multiple subscriber nodes may be associated with a single transportation provider. In case a target subscriber node is in an operationally inactive state, the API gateway 106 may re-route a transaction request (originally published for a target subscriber node) to another subscriber node of the same transportation provider which may be in an operationally active state.

In some embodiments, the API gateway 106 may deliver the first transaction request to the first API agent 110a irrespective of the operational state of the first subscriber node 108a. In such a case, the first API agent 110a may monitor the operational state of the first subscriber node 108a while holding the first transaction request from the first subscriber node 108a, until the current operational state of the first subscriber node 108a changes to the active state. The first API agent 110a may forward the held first transaction request to the first subscriber node 108a when the first subscriber node 108a is operationally in the active state.

Figure 6:
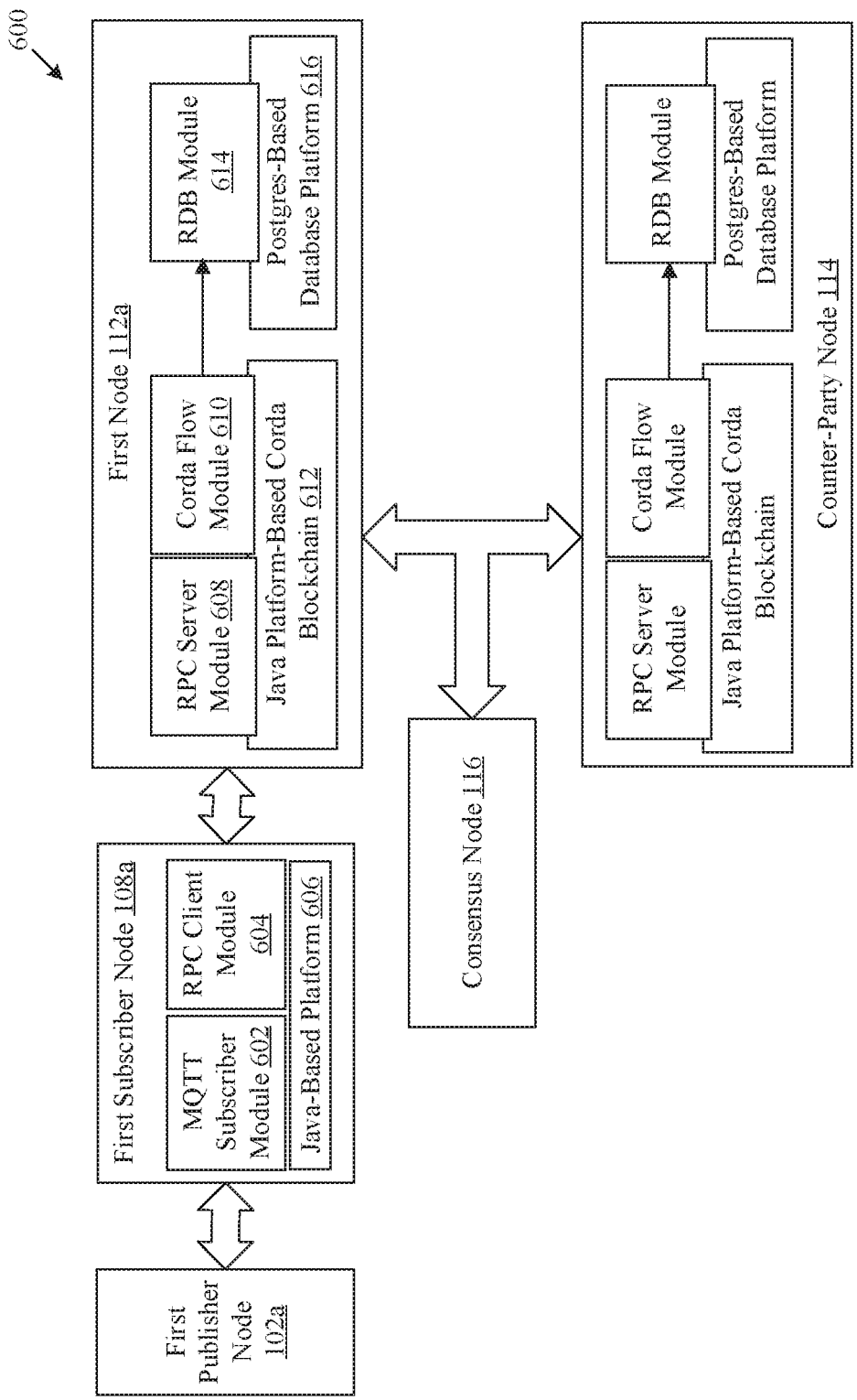
FIG. 6 is a block diagram that illustrates an exemplary implementation of a subscriber node, a node of a distributed ledger, a counter-party node associated with the distributed ledger, and a consensus node associated with the distributed ledger, in accordance with an embodiment of the disclosure.

FIG. 6 is a block diagram that illustrates an exemplary implementation of a subscriber node, a node of a distributed ledger, a counter-party node associated with the distributed ledger, and a consensus node associated with the distributed ledger, in accordance with an embodiment of the disclosure. FIG. 6 is explained in conjunction with elements from FIGS. 1, 2, 3, 4, and 5. With reference to FIG. 6, there is shown a block diagram 600 of the first subscriber node 108a, the first node 112a of the distributed ledger 112, the counter-party node 114, and the consensus node 116.

In FIG. 6, the first publisher node 102a may correspond to an MQTT publisher (i.e. an MQTT client) that may transmit a first transaction request as an MQTT message to the message broker device 104. The message broker device 104 may correspond to an MQTT message broker which may route the first transaction request, via the API gateway 106, to the first subscriber node 108a. The first subscriber node 108a may be an MQTT subscriber (also an MQTT client) which may receive the first transaction request in accordance with a MQTT-based messaging protocol.

The first subscriber node 108a may include an MQTT subscriber module 602 and a Remote Procedure Call (RPC) client module 604 (for example, an asynchronous RPC client), each of which may be executed on a Java-based platform 606. The MQTT subscriber module 602 may receive the first transaction request (i.e., an MQTT message) and may forward the received first transaction request to the RPC client module 604 through one or more RPC calls to the first node 112a of the distributed ledger 112.

In an embodiment, the first node 112a of the distributed ledger 112 may include an RPC server module 608 and a Corda flow module 610, each of which may be executed on a Java platform-based Corda blockchain 612. At the first node 112a, the RPC server module 608 may receive the first transaction request from the RPC client module 604 through the one or more RPC calls of the RPC client module 604. The first node 112a of the distributed ledger 112 may include a Relational Database (RDB) module 614 that may run on a Postgres-based database platform 616. The RDB module 614 may receive database queries from the RPC server module 608 in accordance with a Java Database Connectivity (JDBC) API.

In an embodiment, the counter-party node 114 may also include modules, each of which may be similar to the modules of the first node 112a. Though not shown in FIG. 6, the consensus node 116 may also include modules, each of which may be similar as the modules of the first node 112a.

In operation, the first node 112a may store the first state object 428 (i.e., S1) in the RDB module 614 of the first node 112a, as explained in 402 of FIG. 4. The first subscriber node 108a may be configured to transmit the first transaction request (received as an MQTT message by the MQTT subscriber module 602) from the message broker device 104 (via the API gateway 106) to the first node 112a (as explained in 404 of FIG. 4). As an example, the RPC client module 604 of the first subscriber node 108a may transmit the received first transaction request through the one or more RPC calls to the RPC server module 608, which may pass the first transaction request to the Corda flow module 610 of the first node 112a.

At first, the Corda flow module 610 of the first node 112a may update the first state object 428 (i.e., S1) to produce the second state object 430 (i.e., S2), as explained at 406 of FIG. 4. Thereafter, the Corda flow module 610 of the first node 112a may build the transaction 434a based on the first transaction request (as explained at 408 of FIG. 4), sign the built transaction 434a to generate the signed transaction 434b (as explained at 410 of FIG. 4), and verify the signed transaction 434b (as explained at 412 of FIG. 4). The Corda flow module 610 may transmit the verified transaction 434b to the counter-party node 114 (as explained at 414 of FIG. 4). Corda flow module of the counter-party node 114 may counter-sign the verified transaction 434b to generate the counter-signed transaction 434c (as explained at 416 of FIG. 4) and transmit the counter-signed transaction 434c to the first node 112a (as explained at 418 of FIG. 4). The Corda flow module 610 of the first node 112a may transmit the counter-signed transaction 434c to the consensus node 116 (as explained in 420 of FIG. 4). Corda flow module of the consensus node 116 may notarize the counter-signed transaction 434c to produce the notarized transaction 434d (as explained in FIG. 4) and may transmit the notarized transaction 434d back to the first node 112a (as explained in 424 of FIG. 4). The Corda flow module 610 of the first node 112a may store the notarized transaction 434d as a transaction record through the RDB module 614 of the first node 112a. The notarized transaction 434d may include the updated transaction data accessible by the first node 112a and the counter-party node 114.

A person having ordinary skill in the art will understand that each module of FIG. 6 may correspond to a software program or circuitry onto which the software program runs to execute a defined set of operations of the respective module, as described in FIG. 6.

Figure 7:
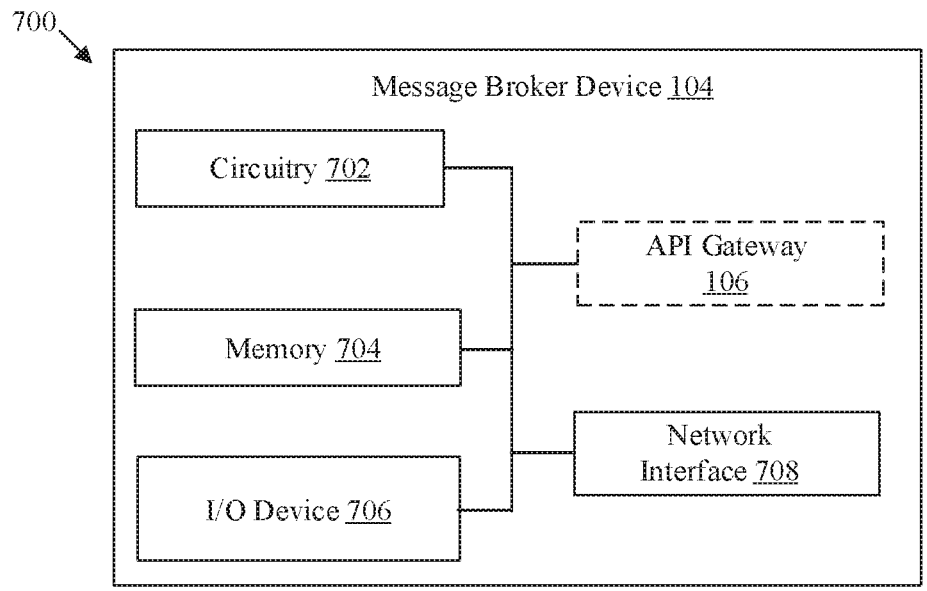
FIG. 7 is a block diagram of an exemplary message broker device, in accordance with an embodiment of the disclosure.

FIG. 7 is a block diagram of an exemplary message broker device, in accordance with an embodiment of the disclosure. FIG. 7 is explained in conjunction with elements from FIGS. 1, 2, 3, 4, 5, and 6. With reference to FIG. 7, there is shown a block diagram 700 of the message broker device 104 of FIG. 1. The message broker device 104 includes circuitry 702, a memory 704, an input/output (I/O) device 706, and a network interface 708. The API gateway 106 may be hosted on the message broker device 104.

The circuitry 702 may be configured to communicate with the plurality of publisher nodes 102 and the plurality of subscriber nodes 108 by use of the network interface 708. The circuitry 702 may include suitable logic, circuitry, interfaces, and/or code that may be configured to execute instructions for operations to be executed by the message broker device 104 and the API gateway 106. Examples of implementation of the circuitry 702 may include a Central Processing Unit (CPU), x86-based processor, a Reduced Instruction Set Computing (RISC) processor, an Application-Specific Integrated Circuit (ASIC) processor, a Complex Instruction Set Computing (CISC) processor, a Graphical Processing Unit (GPU), co-processors, other processors, and/or a combination thereof.

The memory 704 may include suitable logic, circuitry, code, and/or interfaces that may be configured to store the instructions executable by the circuitry 702. Examples of implementation of the memory 704 may include, but are not limited to, Random Access Memory (RAM), Read Only Memory (ROM), Hard Disk Drive (HDD), and/or a Secure Digital (SD) card.

The I/O device 706 may include suitable logic, circuitry, and/or interfaces that may be configured to receive an input and provide an output based on the received input. The I/O device 706 may include various input and output devices, which may be configured to communicate with the circuitry 702. Examples of the I/O device 706 may include, but are not limited to, a touch screen, a keyboard, a mouse, a joystick, a display device, a microphone, or a speaker.

The network interface 708 may include suitable logic, circuitry, interfaces, and/or code that may be configured to enable communication between the message broker device 104, the plurality of publisher nodes 102 and the plurality of subscriber nodes 108, via one or more communication networks (not shown). The network interface 708 may implement known technologies to support wired or wireless communication with the one or more communication networks.

The network interface 708 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer. The network interface 708 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Long Term Evolution (LTE), Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.118g, IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The functions or operations executed by the message broker device 104, as described in FIGS. 1, 2, 3, 4, 5, and 6, may be performed by the circuitry 702. Operations executed by the circuitry 702 are described in detail, for example, in FIGS. 1, 2, 3, 4, 5, and 6.

Figure 8:
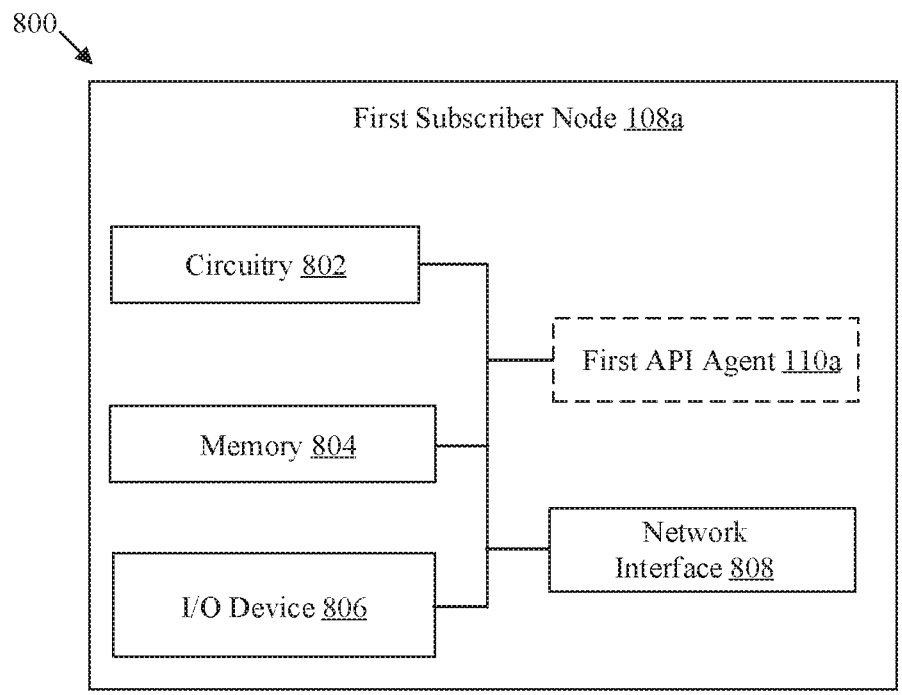
FIG. 8 is a block diagram of an exemplary subscriber node, in accordance with an embodiment of the disclosure.

FIG. 8 is a block diagram of an exemplary subscriber node, in accordance with an embodiment of the disclosure. FIG. 8 is explained in conjunction with elements from FIGS. 1, 2, 3, 4, 5, 6, and 7. With reference to FIG. 8, there is shown a block diagram 800 of the first subscriber node 108a. The first subscriber node 108a includes circuitry 802, a memory 804, an I/O device 806, and a network interface 808. The first subscriber node 108a may further include the first API agent 110a which may be hosted on the first subscriber node 108a.

The circuitry 802 may be configured to communicate with the message broker device 104 and the first node 112a by use of the network interface 808. The circuitry 802 may include suitable logic, circuitry, interfaces, and/or code that may be configured to execute instructions for operations to be executed by the first subscriber node 108a and the first API agent 110a. Examples of implementation of the circuitry 802 may include a CPU, x86-based processor, a RISC processor, an ASIC processor, a CISC processor, a GPU, a co-processor, or a combination thereof.

The memory 804 may include suitable logic, circuitry, code, and/or interfaces that may be configured to store the instructions executable by the circuitry 802. Examples of implementation of the memory 804 may include, but are not limited to, RAM, ROM, HDD, and/or a SD card.

The I/O device 806 may include suitable logic, circuitry, and/or interfaces that may be configured to receive an input and provide an output based on the received input. The I/O device 806 may include various input and output devices, which may be configured to communicate with the circuitry 802. Examples of the I/O device 806 may include, but are not limited to, a touch screen, a keyboard, a mouse, a joystick, a display device, a microphone, and a speaker.

The network interface 808 may include suitable logic, circuitry, interfaces, and/or code that may be configured to enable communication between the first subscriber node 108a, the message broker device 104, and the first node 112a, via one or more communication networks. The network interface 808 may implement known technologies to support wired or wireless communication with the one or more communication networks. The functions of the network interface 808 may be same as the functions of the network interface 708, as described, for example, in FIG. 7. Therefore, the description of the network interface 808 is omitted from the disclosure for the sake of brevity.

The functions or operations executed by the first subscriber node 108a, as described in FIGS. 1, 2, 3, 4, 5, and 6, may be performed by the circuitry 802. Operations executed by the circuitry 802 are described in detail, for example, in FIGS. 1, 2, 3, 4, 5, and 6.

FIG. 9 is a block diagram of an exemplary publisher node, in accordance with an embodiment of the disclosure. FIG. 9 is explained in conjunction with elements from FIGS. 1, 2, 3, 4, 5, 6, 7, and 8. With reference to FIG. 9, there is shown a block diagram 900 of the first publisher node 102a. The first publisher node 102a includes circuitry 902, a memory 904, an I/O device 906, and a network interface 912. The I/O device 906 may include a display device 908 and a UI 910.

The circuitry 902 may be configured to communicate with the message broker device 104 by use of the network interface 912. The circuitry 902 may include suitable logic, circuitry, interfaces, and/or code that may be configured to execute instructions for operations to be executed by the first publisher node 102a. Examples of implementation of the circuitry 902 may include a CPU, x86-based processor, a RISC processor, an ASIC processor, a CISC processor, a GPU, a co-processor, or a combination thereof.

The memory 904 may include suitable logic, circuitry, code, and/or interfaces that may be configured to store the instructions executable by the circuitry 902. Examples of implementation of the memory 904 may include, but are not limited to, RAM, ROM, HDD, and/or a SD card.

The I/O device 906 may include suitable logic, circuitry, and/or interfaces that may be configured to receive an input and provide an output based on the received input. The I/O device 906 may include various input and output devices, which may be configured to communicate with the circuitry 902. Examples of the I/O device 906 may include, but are not limited to, a touch screen, a keyboard, a mouse, a joystick, a display device (for example, the display device 908), a microphone, and a speaker.

The display device 908 may include suitable logic, circuitry, and interfaces that may be configured to display the UI 910, through which a user (such as the user 120) may be able to request a new transport service, initiate the transport service, or close a transport service. For example, the display device 908 may correspond to a display of a POS, a smartphone, or a ticketing gate.

The network interface 912 may include suitable logic, circuitry, interfaces, and/or code that may be configured to enable communication between the first publisher node 102a and the message broker device 104. The network interface 912 may implement known technologies to support wired or wireless communication with the communication network. The functions of the network interface 912 may be same as the functions of the network interface 708, as described, for example, in FIG. 7. Therefore, the description of the network interface 912 is omitted from the disclosure for the sake of brevity.

The functions or operations executed by the first publisher node 102a, as described in FIGS. 1, 2, 3, 4, 5, and 6, may be performed by the circuitry 902. Operations executed by the circuitry 902 are described in detail, for example, in FIGS. 1, 2, 3, 4, 5, and 6.

Figure 10:
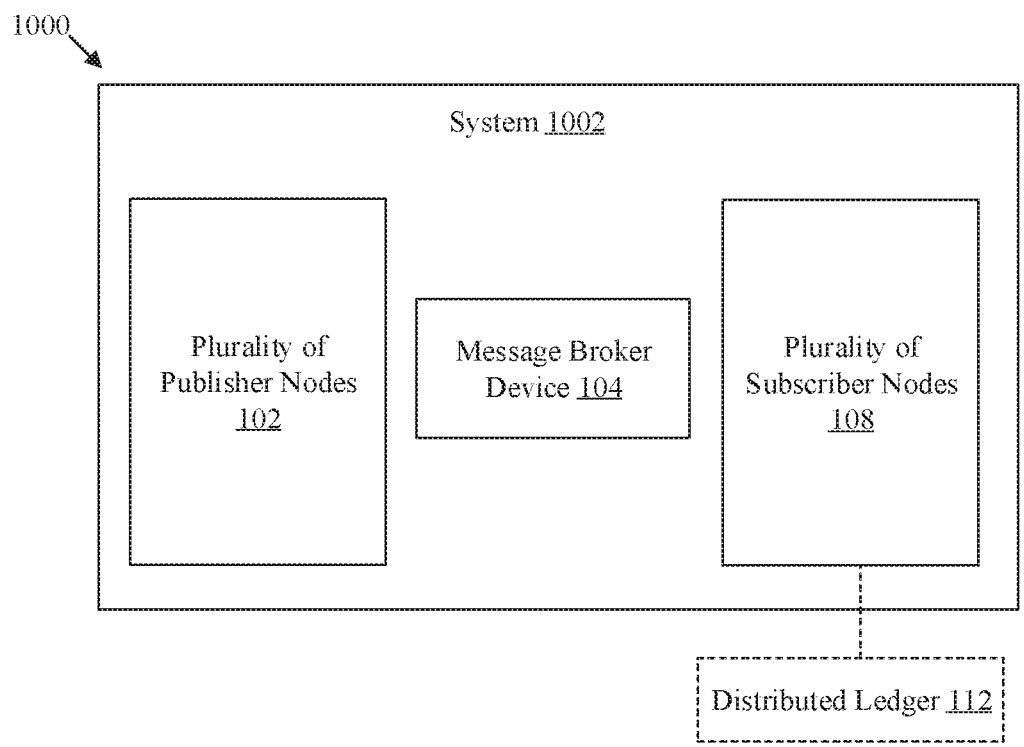
FIG. 10 is a block diagram of an exemplary MaaS-based system, in accordance with an embodiment of the disclosure.

FIG. 10 is a block diagram of an exemplary MaaS-based system, in accordance with an embodiment of the disclosure. FIG. 10 is explained in conjunction with elements from FIGS. 1, 2, 3, 4, 5, 6, 7, 8, and 9. With reference to FIG. 10, there is shown a block diagram 1000 of a system 1002. The system 1002 includes the plurality of publisher nodes 102, the message broker device 104, and the plurality of subscriber nodes 108. The message broker device 104 may host the API gateway 106 and each of the plurality of subscriber nodes 108 may host a corresponding API agent of the plurality of API agents 110. Operation of each entity of the system 1002 is explained in detail, for example, in FIGS. 1, 2, 3, 4, 5, 6, 7, 8, and 9.

Figure 11:
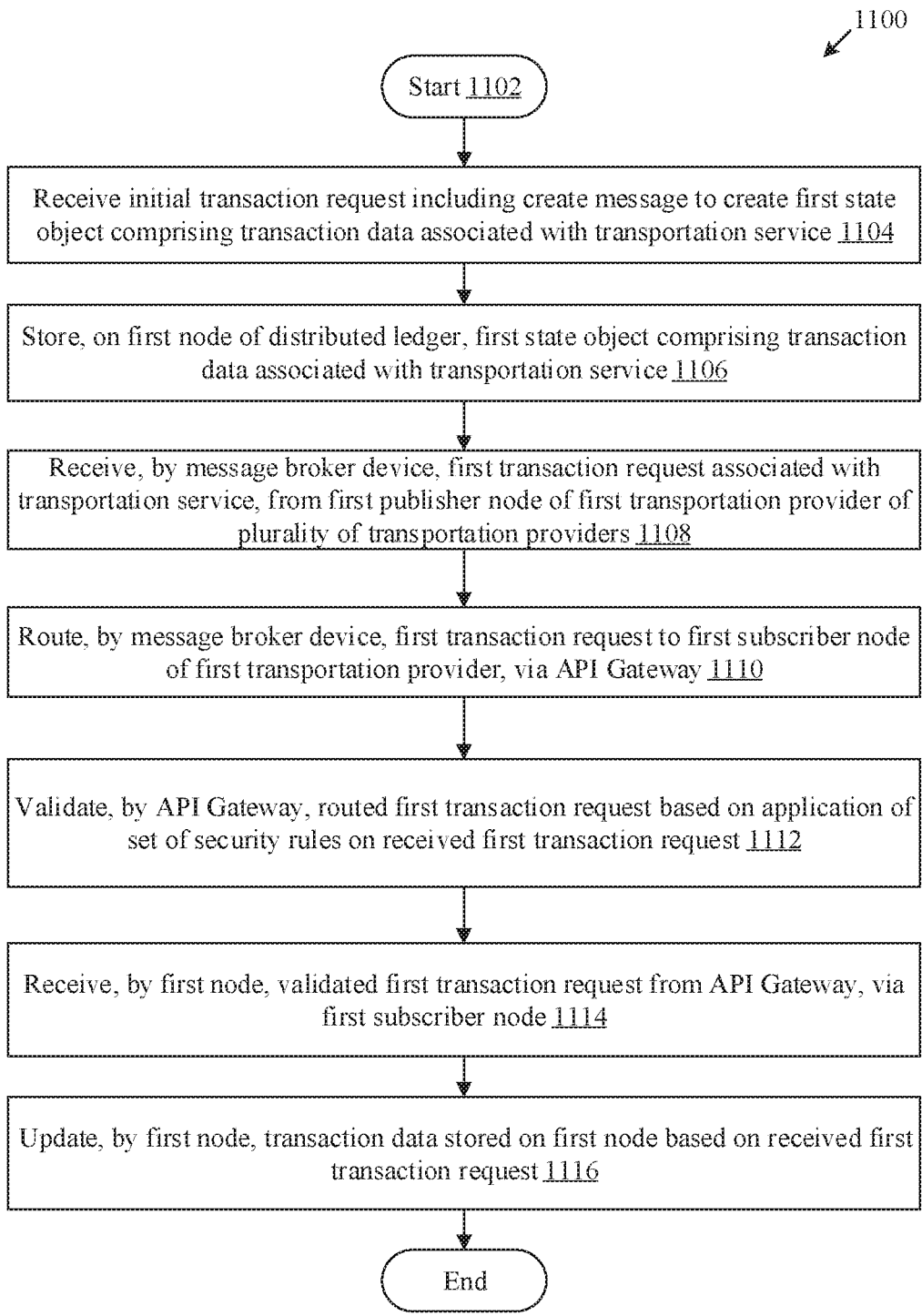
FIG. 11 is a flowchart that illustrates an exemplary method for a secure transaction processing, in accordance with an embodiment of the disclosure.

FIG. 11 is a flowchart that illustrates an exemplary method for a secure transaction processing, in accordance with an embodiment of the disclosure. FIG. 11 is described in conjunction with elements from FIGS. 1, 2, 3, 4, 5, 6, 7, 8, 9, and 10. With reference to FIG. 11, there is shown a flowchart 1100. The exemplary method of the flowchart 1100 may be executed by any computing system, for example, by the first node 112a, the message broker device 104, the API gateway 106, and the first subscriber node 108a of FIG. 1. The exemplary method of the flowchart 1100 may start at 1102 and proceed to 1104.

At 1104, an initial transaction request including a create message may be received. In an embodiment, the first subscriber node 108a may be configured to receive the initial transaction request from the first publisher node 102a. The initial transaction request may include a create message to create the first state object 428 (i.e., S1) including the transaction data associated with a transport service. In an embodiment, the initial transaction request may be received and validated thereafter according to operations from 1108 to 1114. After the validation, the first subscriber node 108a may receive the validated initial transaction request and send the validated initial transaction request to the first node 112a of the distributed ledger 112 for storage and creation of an instance of a record for the new transportation service for the user 120, as explained at 1106.

At 1106, the first state object 428 (i.e., S1) which includes transaction data associated with a transport service may be stored. In an embodiment, the first node 112a of the distributed ledger 112, which may be associated with the first subscriber node 108a, may be configured to store the first state object 428 (i.e., S1). The first node 112a may receive the initial transaction request including the create message for a new transportation service and create a new record for the new transportation service for the user 120 in the first node 112a. The new record in the first node 112a may correspond to the first state object 428 (i.e., S1). Details of the first state object 428 are explained, for example, in FIG. 4.

At 1108, a first transaction request associated with the transport service may be received from the first publisher node 102a of the first transportation. In an embodiment, the message broker device 104 may be configured to receive the first transaction request from the first publisher node 102a.

At 1110, the first transaction request may be routed to the first subscriber node 108a of the first transportation provider, via the API gateway 106. In an embodiment, the message broker device 104 may be configured to route the first transaction request to the first subscriber node 108a, via the API gateway 106.

At 1112, the routed first transaction request may be validated based on application of a set of security rules on the received first transaction request. In an embodiment, the API gateway 106 may be configured to validate the routed first transaction request based on the application of the set of security rules on the received first transaction request. The security filtering of the received first transaction request based on the set of security rules is explained, for example, in FIG. 2.

At 1114, the validated first transaction request may be received from the API gateway 106, via the first subscriber node 108a. In an embodiment, the first node 112a of the distributed ledger 112 may be configured to receive the validated first transaction request from the API gateway 106, via the first subscriber node 108a.

At 1116, the transaction data stored on the first node 112a may be updated based on the received first transaction request. In an embodiment, the first node 112a may be configured to update the transaction data stored on the first node 112a based on the received first transaction request. In an embodiment, the first node 112a may update the initial state object (e.g., the first state object 428) to an updated state object (e.g., the second state object 430). For example, the updated state object may correspond to an update of the state properties included in the initial state object based on the received transaction request. The update of the transaction data stored on the first node 112a is explained, for example, in FIG. 4. Control may further pass to end.

Although the flowchart 1100 is illustrated as discrete operations, such as 1104, 1106, 1108, 1110, 1112, 1114, and 1116, the disclosure is not so limited. Accordingly, in certain embodiments, such discrete operations may be further divided into additional operations, combined into fewer operations, or eliminated, depending on the particular implementation without detracting from the essence of the disclosed embodiments.

Exemplary aspects of the disclosure may include a system that may include a message broker device (such as the message broker device 104) including circuitry (such as, circuitry 202) configured to receive a first transaction request associated with a transport service from a first publisher node (such as the first publisher node 102a) of a first transportation provider of a plurality of transportation providers. The circuitry 202 may be configured to route, via an API gateway (such as the API gateway 106) hosted on the message broker device 104, the first transaction request to a first subscriber node (such as the first subscriber node 108a) of the first transportation provider associated with the received first transaction request. The API gateway 106 may be configured to validate the routed first transaction request based on application of a set of security rules on the received first transaction request. The first subscriber node 108a may be associated with a first node (such as the first node 112a) of a distributed ledger (such as the distributed ledger 112). The first node 112a may be configured to store a first state object (such as the first state object 428) that may include transaction data associated with the transport service. The first node 112a may be configured to receive the validated first transaction request from the API gateway 106, via the first subscriber node 108a and update the transaction data stored on the first node 112a based on the received first transaction request.

In an embodiment, the first publisher node 102a may be one of, but not limited to, a ride booking application, a ticketing gate, or a Point-of-Sale (PoS) of the first transportation provider.

In an embodiment, the distributed ledger 112 may include a Mobility-as-a-Service (MaaS) provider node associated with a MaaS provider. The system may further include a plurality of distributed ledgers associated with a plurality of MaaS providers. Each of the plurality of distributed ledgers may include a MaaS provider node of a corresponding MaaS provider.

In an embodiment, the API gateway 106 may be further configured to validate the routed first transaction request based on a determination that the routed first transaction request is associated with an Internet Protocol (IP) address amongst a valid range of IP addresses. Further, the API gateway 106 may be configured to drop the routed first transaction request based on a determination that the routed first transaction request corresponds to a malicious behavior associated with a cyberattack. In addition, the API gateway 106 may be configured to drop the routed first transaction request based on a determination that the first publisher node is a bot. The API gateway 106 may be configured to validate the routed first transaction request based on a determination that the routed first transaction request is signed with a valid signature. The API gateway 106 may be configured to validate the routed first transaction request based on a verification of an authenticity and an authorization of the first publisher node 102a.

In an embodiment, the set of security rules may include one or more of a first rule to determine whether the routed first transaction request is associated with an Internet Protocol (IP) address amongst a valid range of IP addresses, a second rule to determine whether the routed first transaction request corresponds to a malicious behavior associated with a cyberattack, a third rule to determine whether the first publisher node 102a is a bot, a fourth rule to determine whether the routed first transaction request is signed with a valid signature, and a fifth rule to validate the routed first transaction request based on a verification of an authenticity and an authorization of the first publisher node 102a.

In an embodiment, the system may further include an API agent (such as the first API agent 110a) hosted on the first subscriber node 108a. The API gateway 106 may be configured to receive, from the first API agent 110a, an operational state associated with the first subscriber node 108a. The received operational state may indicate one of a scheduled maintenance, an accidental maintenance, or an unscheduled maintenance of the first subscriber node 108a. The API gateway 106 may be configured to hold the routed first transaction request based on the received operational state. Alternatively, the API gateway 106 may be configured to reroute the first transaction request to the first subscriber node 108a based on a determination that the operational state of the first subscriber node 108a is active.

In an embodiment, the first API agent 110a may be configured to receive the validated first transaction request via the API gateway 106. The first API agent 110a may be configured to pass the validated first transaction request to the first subscriber node 108a based on a determination that the validated first transaction request complies with information access policies of the first subscriber node 108a. The information access policies may include business rules and constraints associated with the transport service.

In an embodiment, the first node 112a may be configured to receive the validated first transaction request from the API gateway 106, via the first subscriber node 108a and update the first state object based on a transaction message in the received first transaction request to output a second state object (such as the second state object 430). The first node 112a may be further configured to build a transaction including the first state object and the second state object.

The first node 112a may be further configured to sign the built transaction 434a and verify the signed transaction 434b. The verification of the signed transaction 434b may be based on a determination that a first result of execution of a first smart contract included in the first state object (428) matches a second result of execution of a second smart contract included in the second state object 430. The first node 112a may be configured to share the verified transaction with a counter-party node (such as the counter-party node 114).

In an embodiment, the counter-party node 114 is configured to counter-sign the shared transaction and share the counter-signed transaction 434c with the first node 112a. In an embodiment, the system may further include a consensus node (such as, the consensus node 116) that may be configured to receive the counter-signed transaction 434c from the first node 112a, notarize the received counter-signed transaction 434c to include a signature of the consensus node 116 and share the notarized transaction 434d with the first node 112a. In an embodiment, the first node 112a may be configured to store the notarized transaction 434d. The notarized transaction 434d may include the updated transaction data that may be accessible to the first node 112a and the counter-party node 114 of the distributed ledger 112.

In an embodiment, the received first transaction request may include one of a create message associated with a creation of the transport service for a user (such as the user 120), a get-in message associated with a start of the transport service for the user 120, or a get-out message associated with completion of the transport service. The transaction data may be associated with one or more of ticketing information, subscription information, payment information, revenue sharing information, or transport service information, associated with the transport service.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. A system, comprising:
a message broker device comprising circuitry configured to:
receive, from a first publisher node of a first transportation provider of a plurality of transportation providers, a first transaction request associated with a transport service; and
route, via an Application Programming Interface (API) gateway hosted on the message broker device, the first transaction request to a first subscriber node of the first transportation provider associated with the received first transaction request, wherein
the API gateway validates the routed first transaction request based on application of a set of security rules on the received first transaction request,
the first subscriber node is associated with a first node of a distributed ledger,
the first node stores a first state object that comprises transaction data associated with the transport service, and
the first node is configured to:
receive the validated first transaction request from the API gateway, via the first subscriber node; and
update the transaction data stored on the first node based on the received first transaction request.

2. The system according to claim 1, wherein the first publisher node is one of a ride booking application, a ticketing gate, or a Point-of-Sale (PoS) of the first transportation provider.

3. The system according to claim 1, wherein the distributed ledger includes a counter-party node as a Mobility-as-a-Service (MaaS) provider node associated with a MaaS provider.

4. The system according to claim 3, further comprising a plurality of distributed ledgers associated with a plurality of MaaS providers, wherein each of the plurality of distributed ledgers includes the counter-party node as the MaaS provider node of a corresponding MaaS provider.

5. The system according to claim 1, wherein the API gateway validates the routed first transaction request based on a determination that the routed first transaction request is associated with an Internet Protocol (IP) address amongst a valid range of IP addresses.

6. The system according to claim 1, wherein the API gateway drops the routed first transaction request based on a determination that the routed first transaction request corresponds to a malicious behavior associated with a cyberattack.

7. The system according to claim 1, wherein the API gateway drops the routed first transaction request based on a determination that the first publisher node is a bot.

8. The system according to claim 1, wherein the API gateway validates the routed first transaction request based on a determination that the routed first transaction request is signed with a valid signature.

9. The system according to claim 1, wherein the API gateway validates the routed first transaction request based on a verification of an authenticity and an authorization of the first publisher node.

10. The system according to claim 1, wherein the set of security rules comprises one or more of:
a first rule to determine whether the routed first transaction request is associated with an Internet Protocol (IP) address amongst a valid range of IP addresses,
a second rule to determine whether the routed first transaction request corresponds to a malicious behavior associated with a cyberattack,
a third rule to determine whether the first publisher node is a bot,
a fourth rule to determine whether the routed first transaction request is signed with a valid signature, and
a fifth rule to validate the routed first transaction request based on a verification of an authenticity and an authorization of the first publisher node.

11. The system according to claim 1, further comprising an API agent hosted on the first subscriber node, wherein the API gateway:
receives, from the API agent, an operational state associated with the first subscriber node,
wherein the received operational state indicates one of a scheduled maintenance, an accidental maintenance, or an unscheduled maintenance of the first subscriber node;
holds the routed first transaction request based on the received operational state; and
reroutes the first transaction request to the first subscriber node based on a determination that the operational state of the first subscriber node is active.

12. The system according to claim 1, further comprising an API agent hosted on the first subscriber node, wherein the API agent is configured to:
receive the validated first transaction request via the API gateway; and
pass the validated first transaction request to the first subscriber node based on a determination that the validated first transaction request complies with information access policies of the first subscriber node,
wherein the information access policies comprise business rules and constraints associated with the transport service.

13. The system according to claim 1, wherein the first node is further configured to:
receive the validated first transaction request from the API gateway, via the first subscriber node;
update the first state object based on a transaction message in the received first transaction request to output a second state object;
build a transaction comprising the first state object and the second state object;
sign the built transaction;
verify the signed transaction based on a determination that a first result of execution of a first smart contract included in the first state object matches a second result of execution of a second smart contract included in the second state object; and
share the verified transaction with a counter-party node.

14. The system according to claim 13, wherein the counter-party node is configured to:
counter-sign the shared transaction; and
share the counter-signed transaction with the first node.

15. The system according to claim 14, further comprising a consensus node configured to:

receive the counter-signed transaction from the first node;
notarize the received counter-signed transaction to include a signature of the consensus node; and
share the notarized transaction with the first node.

16. The system according to claim 15, wherein the first node is configured to store the notarized transaction,
wherein the notarized transaction comprises the updated transaction data accessible to the first node and the counter-party node.

17. The system according to claim 1, wherein the received first transaction request comprises one of a create message associated with a creation of the transport service for a user, a get-in message associated with a start of the transport service for the user, or a get-out message associated with completion of the transport service.

18. The system according to claim 1, wherein the transaction data is associated with one or more of ticketing information, subscription information, payment information, revenue sharing information, or transport service information.

19. A method, comprising:
in a system comprising a message broker device, a first subscriber node, a first node of a distributed ledger, and an Application Programming Interface (API) gateway hosted on the message broker device:
receiving, by the message broker device, a first transaction request associated with a transport service, wherein the first transaction request is received from a first publisher node of a first transportation provider of a plurality of transportation providers;
routing, by the message broker device, the first transaction request to the first subscriber node of the first transportation provider, via the API gateway;
validating, by the API gateway the routed first transaction request based on application of a set of security rules on the received first transaction request, wherein
the first subscriber node is associated with the first node of the distributed ledger, and
the first node stores a first state object that comprises transaction data associated with the transport service;
receiving, by the first node, the validated first transaction request from the API gateway, via the first subscriber node; and
updating, by the first node, the transaction data on stored the first node based on the received first transaction request.

20. The method according to claim 19, wherein the set of security rules comprises one or more of:
a first rule to determine whether the routed first transaction request is associated with an Internet Protocol (IP) address amongst a valid range of IP addresses,
a second rule to determine whether the routed first transaction request corresponds to a malicious behavior associated with a cyberattack,
a third rule to determine whether the first publisher node is a bot,
a fourth rule to determine whether the routed first transaction request is signed with a valid signature, and
a fifth rule to validate the routed first transaction request based on a verification of an authenticity and an authorization of the first publisher node.

21. The method according to claim 19, further comprising:
receiving, by the API gateway, an operational state associated with the first subscriber node, wherein
the operational state is received from an API agent is hosted on the first subscriber node, and
the received operational state indicates one of a scheduled maintenance, an accidental maintenance, or an unscheduled maintenance of the first subscriber node;
holding, by the API gateway, the routed first transaction request based on the received operational state; and
rerouting, by the API gateway, the first transaction request to the first subscriber node based on a determination that the operational state of the first subscriber node is active.

22. The method according to claim 19, further comprising:
receiving, by an API agent, the validated first transaction request via the API gateway,
wherein the API agent is hosted on the first subscriber node; and
passing, by the API agent, the validated first transaction request to the first subscriber node based on a determination that the validated first transaction request complies with information access policies of the first subscriber node,
wherein the information access policies comprise business rules and constraints associated with the transport service.

23. The method according to claim 19, further comprising:
receiving, by the first node, the validated first transaction request from the API gateway, via the first subscriber node;
updating, by the first node, the first state object to output a second state object based on a transaction message in the received first transaction request;
building, by the first node, a transaction comprising the first state object and the second state object;
signing, by the first node, the built transaction;
verifying, by the first node, the signed transaction based on a determination that a first result of execution of a first smart contract included in the first state object matches a second result of execution of a second smart contract included in the second state object; and
sharing, by the first node, the verified transaction with a counter-party node.

* * * * *